(12) United States Patent
Paraschivescu

(10) Patent No.: US 11,782,738 B2
(45) Date of Patent: Oct. 10, 2023

(54) DATA STRUCTURES FOR VISUALIZATION OF HIERARCHICAL DATA

(71) Applicant: Quick Eye Technologies Inc., Chicago, IL (US)

(72) Inventor: Andrei Paraschivescu, Chicago, IL (US)

(73) Assignee: QUICK EYE TECHNOLOGIES INC., Chicago, IL (US)

( * ) Notice: Subject to any disclaimer, the term of this patent is extended or adjusted under 35 U.S.C. 154(b) by 0 days.

(21) Appl. No.: 17/675,883

(22) Filed: Feb. 18, 2022

(65) Prior Publication Data

US 2022/0171638 A1 Jun. 2, 2022

Related U.S. Application Data

(63) Continuation of application No. 14/769,041, filed as application No. PCT/US2014/017209 on Feb. 19, 2014, now Pat. No. 11,256,524.

(60) Provisional application No. 61/766,531, filed on Feb. 19, 2013.

(51) Int. Cl.
G06F 9/451 (2018.01)
G06F 3/0482 (2013.01)
G06F 3/04842 (2022.01)
H04L 67/10 (2022.01)

(52) U.S. Cl.
CPC ............ *G06F 9/451* (2018.02); *G06F 3/0482* (2013.01); *G06F 3/04842* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 7,386,835 | B1* | 6/2008 | Desai | G06F 9/451 |
| | | | | 717/107 |
| 8,667,015 | B2* | 3/2014 | Jiao | G06F 16/986 |
| | | | | 706/14 |
| 9,311,425 | B2* | 4/2016 | Mahan | G06F 16/9574 |
| 2004/0212614 | A1* | 10/2004 | Aila | G06T 15/405 |
| | | | | 345/421 |
| 2005/0273508 | A1 | 12/2005 | Humpleman et al. | |

(Continued)

FOREIGN PATENT DOCUMENTS

WO 02087135 A2 10/2002
WO 2014130580 A2 8/2014

OTHER PUBLICATIONS

International Search Report and Written Opinion dated Aug. 28, 2014 for PCT/US2014/017209 (13 pages).

*Primary Examiner* — Haimei Jiang
(74) *Attorney, Agent, or Firm* — Perkins Coie LLP

(57) ABSTRACT

To provide visualization data to a client device, a server generates a plurality of display objects for selectively displaying at the client device to a user. Each display object includes at least one of a data portion and a graphics portion. The plurality of display objects is assigned to a plurality of vertices organized as a logical display tree. A mask specifying visual characteristics of the plurality of vertices is created. The visual characteristics of a given vertex simultaneously controls display attributes of all display objects assigned to the given vertex. The server transmits a description of the plurality of display objects, the logical display tree and the mask in a payload format.

18 Claims, 30 Drawing Sheets

(56) References Cited

U.S. PATENT DOCUMENTS

| | | | |
|---|---|---|---|
| 2007/0245238 A1* | 10/2007 | Fugitt | G06F 3/0481 |
| | | | 715/700 |
| 2009/0106663 A1* | 4/2009 | Pirie | H04L 67/53 |
| | | | 715/744 |
| 2010/0030969 A1* | 2/2010 | Basham | G06F 12/0806 |
| | | | 711/E12.017 |
| 2010/0223593 A1* | 9/2010 | Eldridge | G05B 19/0426 |
| | | | 717/105 |
| 2010/0268773 A1* | 10/2010 | Hunt | G06F 16/9577 |
| | | | 715/245 |
| 2010/0333026 A1 | 12/2010 | Hooper et al. | |
| 2011/0258532 A1* | 10/2011 | Ceze | G06F 16/9574 |
| | | | 715/234 |
| 2012/0260157 A1* | 10/2012 | Zhu | G06F 16/9574 |
| | | | 709/213 |
| 2012/0290940 A1* | 11/2012 | Quine | G06F 8/34 |
| | | | 715/744 |
| 2013/0031501 A1* | 1/2013 | Kodosky | G06F 3/04842 |
| | | | 715/771 |
| 2014/0096013 A1* | 4/2014 | Grosz | G06F 3/1205 |
| | | | 715/733 |
| 2016/0004544 A1 | 1/2016 | Paraschivescu | |

* cited by examiner

| ● ◉ ○ Orga... |
|---|
| dir\|type\|user\|last |
| 4069 |

FIG. 1

| ● ◉ ○ Organizer | | | |
|---|---|---|---|
| dir | type | user | last |
| 4038 | | | |
| | | NA | – |
| | | . | 2 |
| | | docs | 53 |
| | | econBoost | 59 |
| | | econSetup | 34 |
| | | econWrap | 60 |
| | | foo | 24 |
| | | fx | 205 |
| | | GUIkit | 503 |
| | | localPY | 30 |
| | | ngen | 69 |
| | | objectMart | 256 |
| | | objectMartc | 246 |
| | | om0_0 | 606 |
| | | om0_1 | 730 |
| | | omex | 37 |
| | | omlib | 58 |
| | | omRiskMan | 66 |
| | | physical | 62 |
| | | physical2 | 57 |
| | | riskMan | 91 |
| | | rmSetup | 47 |
| | | sandbox | 96 |
| | | setup1 | 130 |
| | | setup1c | 118 |
| | | setup2 | 16 |
| | | solver | 40 |
| | | ssModel | 40 |
| | | switch | 13 |
| | | Transport | 78 |
| | | twolayer | 93 |
| | | twolayer2 | 80 |
| | | utils | 39 |

FIG. 2

| Organizer | | | | | | |
|---|---|---|---|---|---|---|
| | dir | type | user | last | | |
| 4038 | N/A | / | exe | docs | media | devel |
| NA | – | – | – | – | – | – |
| . | 1 | – | 1 | – | – | – |
| docs | 29 | 5 | 4 | 5 | – | 10 |
| econBoost | 23 | 14 | 6 | – | – | 16 |
| econSetup | 12 | 7 | – | – | – | 15 |
| econWrap | 18 | 12 | 2 | – | – | 28 |
| foo | 14 | 4 | – | – | – | 6 |
| fx | 58 | 13 | 64 | – | – | 70 |
| GUIkit | 18 | 59 | – | – | – | 426 |
| localPY | 14 | 7 | – | – | – | 9 |
| ngen | 39 | 9 | 1 | – | – | 20 |
| objectMart | 23 | 33 | – | – | – | 200 |
| objectMartc | 16 | 32 | – | – | – | 198 |
| om0_0 | 21 | 70 | – | – | – | 515 |
| om0_1 | 20 | 72 | 1 | – | – | 637 |
| omex | 15 | 9 | 1 | – | – | 12 |
| omlib | 19 | 12 | – | – | – | 27 |
| omRiskMan | 21 | 13 | – | 1 | – | 31 |
| physical | 20 | 15 | – | – | – | 27 |
| physical2 | 16 | 14 | – | – | – | 27 |
| riskMan | 32 | 11 | 21 | – | – | 27 |
| rmSetup | 17 | 9 | – | 1 | – | 20 |
| sandbox | 19 | 19 | – | – | – | 58 |
| setup1 | 19 | 14 | – | – | – | 97 |
| setup1c | 14 | 13 | – | – | – | 91 |
| setup2 | 6 | 4 | – | – | – | 6 |
| solver | 22 | 4 | 6 | – | – | 8 |
| ssModel | 12 | 7 | – | – | – | 21 |
| switch | 11 | – | 2 | – | – | – |
| Transport | 16 | 13 | 2 | – | – | 47 |
| twolayer | 16 | 16 | – | – | – | 61 |
| twolayer2 | 10 | 13 | – | – | – | 57 |
| utils | 15 | 9 | – | – | – | 15 |

FIG. 3

| | dir | type | user | last | | |
|---|---|---|---|---|---|---|
| 4038 | N/A | / | exe | docs | media | devel |
| NA | – | – | – | – | – | – |
| . | 1 | – | 1 | – | – | – |
| docs | 29 | 5 | 4 | 5 | – | 10 |
| econBoost | 23 | 14 | 6 | – | – | 16 |
| econSetup | 12 | 7 | – | – | – | 15 |
| econWrap | 18 | 12 | 2 | – | – | 28 |
| foo | 14 | 4 | – | – | – | 6 |
| fx | 58 | 13 | 64 | – | – | 70 |
| GUIkit | 18 | 59 | – | – | – | 426 |
| localPY | 14 | 7 | – | – | – | 9 |
| ngen | 39 | 9 | 1 | – | – | 20 |
| objectMart | 23 | 33 | – | – | – | 200 |
| objectMartc | 16 | 32 | – | – | – | 198 |
| om0_0 | 21 | 70 | – | – | – | 515 |
| om0_1 | 20 | 72 | 1 | – | – | 637 |
| omex | 15 | 9 | 1 | – | – | 12 |
| omlib | 19 | 12 | – | – | – | 27 |
| omRiskMan | 21 | 13 | – | 1 | – | 31 |
| physical | 20 | 15 | – | – | – | 27 |
| physical2 | 16 | 14 | – | – | – | 27 |
| riskMan | 32 | 11 | 21 | – | – | 27 |
| rmSetup | 17 | 9 | – | 1 | – | 20 |
| sandbox | 19 | 19 | – | – | – | 58 |
| setup1 | 19 | 14 | – | – | – | 97 |
| setup1c | 14 | 13 | – | – | – | 91 |
| setup2 | 6 | 4 | – | – | – | 6 |
| solver | 22 | 4 | 6 | – | – | 8 |
| ssModel | 12 | 7 | – | – | – | 21 |
| switch | 11 | – | 2 | – | – | – |
| Transport | 16 | 13 | 2 | – | – | 47 |
| twolayer | 16 | 16 | – | – | – | 61 |
| twolayer2 | 10 | 13 | – | – | – | 57 |
| utils | 15 | 9 | – | – | – | 15 |

FIG. 4

| | Organizer | | | | | |
|---|---|---|---|---|---|---|
| | dir | type | user | last | | |
| 0 | N/A | / | exe | docs | media | devel |
| NA | – | – | – | – | – | – |
| . | 1 | – | 1 | – | – | – |
| docs | 29 | 5 | 4 | 5 | – | 10 |
| econBoost | 23 | 14 | 6 | – | – | 16 |
| econSetup | 12 | 7 | – | – | – | 15 |
| econWrap | 18 | 12 | 2 | – | – | 28 |
| foo | 14 | 4 | – | – | – | 6 |
| fx | 58 | 13 | 64 | – | – | 70 |
| GUIkit | 18 | 59 | – | – | – | 426 |
| localPY | 14 | 7 | – | – | – | 9 |
| ngen | 39 | 9 | 1 | – | – | 20 |
| objectMart | 23 | 33 | – | – | – | 200 |
| objectMartc | 16 | 32 | – | – | – | 198 |
| om0_0 | 21 | 70 | – | – | – | 515 |
| om0_1 | 20 | 72 | 1 | – | – | 637 |
| omex | 15 | 9 | 1 | – | – | 12 |
| omlib | 19 | 12 | – | – | – | 27 |
| omRiskMan | 21 | 13 | – | 1 | – | 31 |
| physical | 20 | 15 | – | – | – | 27 |
| physical2 | 16 | 14 | – | – | – | 27 |
| riskMan | 32 | 11 | 21 | – | – | 27 |
| rmSetup | 17 | 9 | – | 1 | – | 20 |
| sandbox | 19 | 19 | – | – | – | 58 |
| setup1 | 19 | 14 | – | – | – | 97 |
| setup1c | 14 | 13 | – | – | – | 91 |
| setup2 | 6 | 4 | – | – | – | 6 |
| solver | 22 | 4 | 6 | – | – | 8 |
| ssModel | 12 | 7 | – | – | – | 21 |
| switch | 11 | – | 2 | – | – | – |
| Transport | 16 | 13 | 2 | – | – | 47 |
| twolayer | 16 | 16 | – | – | – | 61 |
| twolayer2 | 10 | 13 | – | – | – | 57 |
| utils | 15 | 9 | – | – | – | 15 |

FIG. 5

| Organizer | | | | | | |
|---|---|---|---|---|---|---|
| | dir | type | user | last | | |
| 842 | N/A | / | exe | docs | media | devel |
| NA | – | – | – | – | – | – |
| . | 1 | – | 1 | – | – | – |
| docs | 29 | 5 | 4 | 5 | – | 10 |
| econBoost | 23 | 14 | 6 | – | – | 16 |
| econSetup | 12 | 7 | – | – | – | 15 |
| econWrap | 18 | 12 | 2 | – | – | 28 |
| foo | 14 | 4 | – | – | – | 6 |
| fx | 58 | 13 | 64 | – | – | 70 |
| GUIkit | 18 | 59 | – | – | – | 426 |
| localPY | 14 | 7 | – | – | – | 9 |
| ngen | 39 | 9 | 1 | – | – | 20 |
| objectMart | 23 | 33 | – | – | – | 200 |
| objectMartc | 16 | 32 | – | – | – | 198 |
| om0_0 | 21 | 70 | – | – | – | 515 |
| om0_1 | 20 | 72 | 1 | – | – | 637 |
| omex | 15 | 9 | 1 | – | – | 12 |
| omlib | 19 | 12 | – | – | – | 27 |
| omRiskMan | 21 | 13 | – | 1 | – | 31 |
| physical | 20 | 15 | – | – | – | 27 |
| physical2 | 16 | 14 | – | – | – | 27 |
| riskMan | 32 | 11 | 21 | – | – | 27 |
| rmSetup | 17 | 9 | – | 1 | – | 20 |
| sandbox | 19 | 19 | – | – | – | 58 |
| setup1 | 19 | 14 | – | – | – | 97 |
| setup1c | 14 | 13 | – | – | – | 91 |
| setup2 | 6 | 4 | – | – | – | 6 |
| solver | 22 | 4 | 6 | – | – | 8 |
| ssModel | 12 | 7 | – | – | – | 21 |
| switch | 11 | – | 2 | – | – | – |
| Transport | 16 | 13 | 2 | – | – | 47 |
| twolayer | 16 | 16 | – | – | – | 61 |
| twolayer2 | 10 | 13 | – | – | – | 57 |
| utils | 15 | 9 | – | – | – | 15 |

FIG. 6

| | Organizer | | | | | |
|---|---|---|---|---|---|---|
| | dir | type | user | last | | |
| 842 | N/A | / | exe | docs | media | devel |
| econBoost | 23 | 14 | 6 | – | – | 16 |
| econSetup | 12 | 7 | – | – | – | 15 |
| econWrap | 18 | 12 | 2 | – | – | 28 |
| GUIkit | 18 | 59 | – | – | – | 426 |
| ngen | 39 | 9 | 1 | – | – | 20 |
| Transport | 16 | 13 | 2 | – | – | 47 |
| utils | 15 | 9 | – | – | – | 15 |

FIG. 7

| | Organizer | | | | | |
|---|---|---|---|---|---|---|
| | dir | type | user | last | | |
| 701 | N/A | / | exe | docs | media | devel |
| econBoost | 23 | 14 | 6 | – | – | 16 |
| econSetup | 12 | 7 | – | – | – | 15 |
| econWrap | 18 | 12 | 2 | – | – | 28 |
| GUIkit | 18 | 59 | – | – | – | 426 |
| ngen | 39 | 9 | 1 | – | – | 20 |
| Transport | 16 | 13 | 2 | – | – | 47 |
| utils | 15 | 9 | – | – | – | 15 |

| ●◉○ | Organizer | | | | | |
|---|---|---|---|---|---|---|
| | dir | type | user | last | | |
| 701 | / | exe | devel | | | |
| econBoost | 14 | 6 | 16 | | | |
| econSetup | 7 | – | 15 | | | |
| econWrap | 12 | 2 | 28 | | | |
| GUIkit | 59 | 0 | 426 | C/C++ | python | hg |
| | N/A – | N/A – | N/A – | – | – | – |
| | 2012 59 | 2012 – | 2012 – | – | 103 | 323 |
| | 2011 – | 2011 – | 2011 – | – | – | – |
| | 2010 – | 2010 – | 2010 – | – | – | – |
| | 2009 – | 2009 – | 2009 – | – | – | – |
| | 2008 – | 2008 – | 2008 – | – | – | – |
| | 2007 – | 2007 – | 2007 – | – | – | – |
| | 2006 – | 2006 – | 2006 – | – | – | – |
| | 2005 – | 2005 – | 2005 – | – | – | – |
| | 2004 – | 2004 – | 2004 – | – | – | – |
| | 2003 – | 2003 – | 2003 – | – | – | – |
| | 2002 – | 2002 – | 2002 – | – | – | – |
| | 2001 – | 2001 – | 2001 – | – | – | – |
| | 2000 – | 2000 – | 2000 – | – | – | – |
| | 1999 – | 1999 – | 1999 – | – | – | – |
| | 1998 – | 1998 – | 1998 – | – | – | – |
| | 1997 – | 1997 – | 1997 – | – | – | – |
| | 1996 – | 1996 – | 1996 – | – | – | – |
| | 1995 – | 1995 – | 1995 – | – | – | – |
| ngen | 9 | 1 | 20 | | | |
| Transport | 13 | 2 | 47 | | | |
| utils | 9 | – | 15 | | | |

FIG. 11

| ● ◉ ○ Orga... |||||
|---|---|---|---|---|
| dir | type | user | last ||
|| 103 ||||
|||||  |

FIG. 12

| ● ◉ ○ Organizer |||||
|---|---|---|---|---|
| dir | type | user | last ||
| 103 | N/A | root | andrei ||
|| – | – | 103 ||

FIG. 13

| ● ◉ ○ Orga... |||||
|---|---|---|---|---|
| dir | type | user | last ||
|| 103 ||||

| | dir | type | user | last |
|---|---|---|---|---|
| Organizer | | | | |
| 103 | N/A | root | andrei | |

| | 103 | |
|---|---|---|
| Jan | 9 | |
| Feb | – | |
| Mar | 27 | |
| Apr | – | |
| May | – | |
| Jun | – | |
| Jul | – | |
| Aug | – | |
| Sep | – | |
| Oct | – | |
| Nov | 19 | |

```
src/__init__.py
src/packageGKT/__init__.py
src/packageGKT/_resources.py
src/packageGKT/comm/__init__.py
src/packageGKT/comm/_resource
src/packageGKT/comm/directTran
src/packageGKT/diff/_resources.p
src/packageGKT/diff/error.py
src/packageGKT/guiServer/auto_t
src/testsGKT/__init__.py
```

| Dec | 48 |
|---|---|

FIG. 17

| | dir | type | user | last |
|---|---|---|---|---|
| 103 | N/A | root | andrei | |

103
Jan 9
Feb –
Mar 27
Apr –
May –
Jun –
Jul –
Aug –
Sep –
Oct –
Nov 19
Dec 48

FIG. 18

| Organizer | | | | | | | | |
|---|---|---|---|---|---|---|---|---|
| | dir | type | user | last | | | | |
| 701 | / | exe | devel | | | | | |
| econBoost | 14 | 6 | 16 | | | | | |
| econSetup | 7 | – | 15 | | | | | |
| econWrap | 12 | 2 | 28 | | | | | |
| GUIkit | 59 | 0 | 426 | C/C++ | python | | | hg |
| | N/A – | N/A – | N/A | – | – | | | – |
| | 2012 59 | 2012 – | 2012 | – | 103 | N/A | root andrei | 323 |
| | 2011 – | 2011 – | | | | | 103 | |
| | 2010 – | 2010 – | | | | | Jan 9 | |
| | 2009 – | 2009 – | | | | | Feb – | |
| | 2008 – | 2008 – | | | | | Mar 27 | |
| | 2007 – | 2007 – | | | | | Apr – | |
| | 2006 – | 2006 – | | | | | May – | |
| | 2005 – | 2005 – | | | | | Jun – | |
| | 2004 – | 2004 – | | | | | Jul – | |
| | 2003 – | 2003 – | | | | | Aug – | |
| | 2002 – | 2002 – | | | | | Sep – | |
| | 2001 – | 2001 – | | | | | Oct – | |
| | 2000 – | 2000 – | | | | | Nov 19 | |
| | 1999 – | 1999 – | | | | | Dec 48 | |
| | 1998 – | 1998 – | | | | | | |
| | 1997 – | 1997 – | 2011 | – | – | | | – |
| | 1996 – | 1996 – | 2010 | – | – | | | – |
| | 1995 – | 1995 – | 2009 | – | – | | | – |
| | | | 2008 | – | – | | | – |
| | | | 2007 | – | – | | | – |
| | | | 2006 | – | – | | | – |
| | | | 2005 | – | – | | | – |
| | | | 2004 | – | – | | | – |
| | | | 2003 | – | – | | | – |
| | | | 2002 | – | – | | | – |
| | | | 2001 | – | – | | | – |
| | | | 2000 | – | – | | | – |
| | | | 1999 | – | – | | | – |
| | | | 1998 | – | – | | | – |
| | | | 1997 | – | – | | | – |
| | | | 1996 | – | – | | | – |
| | | | 1995 | – | – | | | – |
| ngen | 9 | 1 | 20 | | | | | |
| Transport | 13 | 2 | 47 | | | | | |
| utils | 9 | – | 15 | | | | | |

FIG. 19

| | Organizer | | | | | | | | |
|---|---|---|---|---|---|---|---|---|---|
| | dir | type | user | last | | | | | |
| 701 | / | exe | devel | | | | | | |
| NA | – | – | – | | | | | | |
| · | – | 1 | – | | | | | | |
| docs | 5 | 4 | 10 | | | | | | |
| econBoost | 14 | 6 | 16 | | | | | | |
| econSetup | 7 | – | 15 | | | | | | |
| econWrap | 12 | 2 | 28 | | | | | | |
| foo | 4 | – | 6 | | | | | | |
| fx | 13 | 64 | 70 | | | | | | |
| GUIkit | 59 | 0 | 426 | C/C++ | python | | | | hg |
| | N/A | – | N/A | – | N/A | – | | | – |
| | 2012 | 59 | 2012 | – | 2012 | – | 103 | N/A | root | andrei | 323 |
| | 2011 | | 2011 | | | | | | 103 |
| | 2010 | | 2010 | | | | | | Jan | 9 |
| | 2009 | | 2009 | | | | | | Feb | – |
| | 2008 | | 2008 | | | | | | Mar | 27 |
| | 2007 | | 2007 | | | | | | Apr | – |
| | 2006 | | 2006 | | | | | | May | – |
| | 2005 | | 2005 | | | | | | Jun | – |
| | 2004 | | 2004 | | | | | | Jul | – |
| | 2003 | | 2003 | | | | | | Aug | – |
| | 2002 | | 2002 | | | | | | Sep | – |
| | 2001 | | 2001 | | | | | | Oct | – |
| | 2000 | | 2000 | | | | | | Nov | 19 |
| | 1999 | | 1999 | | | | | | Dec | 48 |
| | 1998 | | 1998 | | | | | | | |
| | 1997 | | 1997 | | 2011 | – | – | – | | – |
| | 1996 | | 1996 | | 2010 | – | – | – | | – |
| | 1995 | | 1995 | | 2009 | – | – | – | | – |
| | | | | | 2008 | – | – | – | | – |
| | | | | | 2007 | – | – | – | | – |
| | | | | | 2006 | – | – | – | | – |
| | | | | | 2005 | – | – | – | | – |
| | | | | | 2004 | – | – | – | | – |
| | | | | | 2003 | – | – | – | | – |
| | | | | | 2002 | – | – | – | | – |
| | | | | | 2001 | – | – | – | | – |
| | | | | | 2000 | – | – | – | | – |
| | | | | | 1999 | – | – | – | | – |
| | | | | | 1998 | – | – | – | | – |
| | | | | | 1997 | – | – | – | | – |
| | | | | | 1996 | – | – | – | | – |
| | | | | | 1995 | – | – | – | | – |
| localPY | 7 | – | 9 | | | | | | |
| ngen | 9 | 1 | 20 | | | | | | |
| objectMart | 33 | – | 200 | | | | | | |
| objectMartc | 32 | – | 198 | | | | | | |
| om0_0 | 70 | – | 515 | | | | | | |
| om0_1 | 72 | 1 | 637 | | | | | | |
| omex | 9 | 1 | 12 | | | | | | |
| omlib | 12 | – | 27 | | | | | | |
| omRiskMan | 13 | – | 31 | | | | | | |
| physical | 15 | – | 27 | | | | | | |
| physical2 | 14 | – | 27 | | | | | | |
| riskMan | 11 | 21 | 27 | | | | | | |
| rmSetup | 9 | – | 20 | | | | | | |
| sandbox | 19 | – | 58 | | | | | | |
| setup1 | 14 | – | 97 | | | | | | |
| setup1c | 13 | – | 91 | | | | | | |
| setup2 | 4 | – | 6 | | | | | | |
| solver | 4 | 6 | 8 | | | | | | |
| ssModel | 7 | – | 21 | | | | | | |
| switch | – | 2 | – | | | | | | |
| Transport | 13 | 2 | 47 | | | | | | |
| twolayer | 16 | – | 61 | | | | | | |
| twolayer2 | 13 | – | 57 | | | | | | |
| utils | 9 | – | 15 | | | | | | |

| ● ◉ ○ Organizer | | | |
|---|---|---|---|
| dir | type | user | last |
| 216    / | | exe | devel |
| econBoost | 14 | 6 | 16 |
| econSetup | 7 | – | 15 |
| econWrap | 12 | 2 | 28 |
| ngen | 9 | 1 | 20 |
| Transport | 13 | 2 | 47 |
| utils | 9 | – | 15 |

FIG. 22

| | dir | type | user | last |
|---|---|---|---|---|
| 701 | / | exe | devel | |
| NA | – | – | – | |
| • | – | 1 | – | |
| docs | 5 | 4 | 10 | |
| econBoost | 14 | 6 | 16 | |
| econSetup | 7 | – | 15 | |
| econWrap | 12 | 2 | 28 | |
| foo | 4 | – | 6 | |
| fx | 13 | 64 | 70 | |
| GUIkit | 59 | 0 | 426 | C/C++ python hg |
| N/A | N/A | N/A | N/A | – – – |
| 2012 | 59 | 2012 | 2012 | – 103 N/A root andrei 323 |
| 2011 | – | 2011 | | – – 103 |
| 2010 | – | 2010 | | Jan 9 |
| 2009 | – | 2009 | | Feb – |
| 2008 | – | 2008 | | Mar 27 |
| 2007 | – | 2007 | | Apr – |
| 2006 | – | 2006 | | May – |
| 2005 | – | 2005 | | Jun – |
| 2004 | – | 2004 | | Jul – |
| 2003 | – | 2003 | | Aug – |
| 2002 | – | 2002 | | Sep – |
| 2001 | – | 2001 | | Oct – |
| 2000 | – | 2000 | | Nov 19 |
| 1999 | – | 1999 | | Dec 48 |
| 1998 | – | 1998 | | |
| 1997 | – | 1997 | 2011 | – – |
| 1996 | – | 1996 | 2010 | – – |
| 1995 | – | 1995 | 2009 | – – |
| | | | 2008 | – – |
| | | | 2007 | – – |
| | | | 2006 | – – |
| | | | 2005 | – – |
| | | | 2004 | – – |
| | | | 2003 | – – |
| | | | 2002 | – – |
| | | | 2001 | – – |
| | | | 2000 | – – |
| | | | 1999 | – – |
| | | | 1998 | – – |
| | | | 1997 | – – |
| | | | 1996 | – – |
| | | | 1995 | – – |
| localPY | 7 | – | 9 | |
| ngen | 9 | 1 | 20 | |
| objectMart | 33 | – | 200 | |
| objectMartc | 32 | – | 198 | |
| om0_0 | 70 | – | 515 | |
| om0_1 | 72 | 1 | 637 | |
| omex | 9 | 1 | 12 | |
| omlib | 12 | – | 27 | |
| omRiskMan | 13 | – | 31 | |
| physical | 15 | – | 27 | |
| physical2 | 14 | – | 27 | |
| riskMan | 11 | 21 | 27 | |
| rmSetup | 9 | – | 20 | |
| sandbox | 19 | – | 58 | |
| setup1 | 14 | – | 97 | |
| setup1c | 13 | – | 91 | |
| setup2 | 4 | – | 6 | |
| solver | 4 | 6 | 8 | |
| ssModel | 7 | – | 21 | |
| switch | – | 2 | – | |
| Transport | 13 | 2 | 47 | |
| twolayer | 16 | – | 61 | |
| twolayer2 | 13 | – | 57 | |
| utils | 9 | – | 15 | |

FIG. 23

| | Organizer | | | | | | | | |
|---|---|---|---|---|---|---|---|---|---|
| | | dir | type | user | last | | | | |
| 701 | / | | exe | | devel | | | | |
| econBoost | 14 | | 6 | | 16 | | | | |
| econSetup | 7 | | – | | 15 | | | | |
| econWrap | 12 | | 2 | | 28 | | | | |
| GUIkit | 59 | | 0 | | 426 | C/C++ | python | | hg |
| | N/A | – | N/A | – | N/A | – | – | | – |
| | 2012 | 59 | 2012 | – | 2012 | – | 103 | N/A root andrei | 323 |
| | 2011 | – | 2011 | – | | | | – – 103 | |
| | 2010 | – | 2010 | – | | | | Jan 9 | |
| | 2009 | – | 2009 | – | | | | Feb – | |
| | 2008 | – | 2008 | – | | | | Mar 27 | |
| | 2007 | – | 2007 | – | | | | Apr – | |
| | 2006 | – | 2006 | – | | | | May – | |
| | 2005 | – | 2005 | – | | | | Jun – | |
| | 2004 | – | 2004 | – | | | | Jul – | |
| | 2003 | – | 2003 | – | | | | Aug – | |
| | 2002 | – | 2002 | – | | | | Sep – | |
| | 2001 | – | 2001 | – | | | | Oct – | |
| | 2000 | – | 2000 | – | | | | Nov 19 | |
| | 1999 | – | 1999 | – | | | | Dec 48 | |
| | 1998 | – | 1998 | – | | | | | |
| | 1997 | – | 1997 | – | 2011 | – | – | | – |
| | 1996 | – | 1996 | – | 2010 | – | – | | – |
| | 1995 | – | 1995 | – | 2009 | – | – | | – |
| | | | | | 2008 | – | – | | – |
| | | | | | 2007 | – | – | | – |
| | | | | | 2006 | – | – | | – |
| | | | | | 2005 | – | – | | – |
| | | | | | 2004 | – | – | | – |
| | | | | | 2003 | – | – | | – |
| | | | | | 2002 | – | – | | – |
| | | | | | 2001 | – | – | | – |
| | | | | | 2000 | – | – | | – |
| | | | | | 1999 | – | – | | – |
| | | | | | 1998 | – | – | | – |
| | | | | | 1997 | – | – | | – |
| | | | | | 1996 | – | – | | – |
| | | | | | 1995 | – | – | | – |
| ngen | 9 | | 1 | | 20 | | | | |
| Transport | 13 | | 2 | | 47 | | | | |
| utils | 9 | | – | | 15 | | | | |

FIG. 24

| | dir | type | user | last | | |
|---|---|---|---|---|---|---|
| 701 | / | exe | devel | | | |
| econBoost | 14 | 6 | 16 | | | |
| econSetup | 7 | – | 15 | | | |
| econWrap | 12 | 2 | 28 | | | |
| GUIkit | 59 | – | 426 | C/C++ – | python 103 | hg 323 |
| ngen | 9 | 1 | 20 | | | |
| Transport | 13 | 2 | 47 | | | |
| utils | 9 | – | 15 | | | |

Organizer

FIG. 25

| | dir | type | user | last |
|---|---|---|---|---|
| 3456 | / | exe | devel | |
| | 563 | 111 | 2782 | |

Organizer

FIG. 26

DATA STRUCTURES FOR VISUALIZATION OF HIERARCHICAL DATA

CROSS REFERENCE TO RELATED APPLICATION

This patent document is a continuation of and claims the benefit of priority to U.S. patent application Ser. No. 14/769,041 entitled "DATA STRUCTURES FOR VISUALIZATION OF HIERARCHICAL DATA," filed on Aug. 19, 2015, which is a 35 U.S.C. § 371 National Stage application of PCT Application No. PCT/US2014/017209 entitled "DATA VISUALIZATION TECHNIQUES," filed on Feb. 19, 2014, which further claims the benefit of priority of U.S. Provisional Patent Application No. 61/766,531 entitled "DATA VISUALIZATION TECHNIQUES," filed on Feb. 19, 2013. The entire content of the aforementioned patent applications are incorporated by reference as part of the disclosure of this application.

BACKGROUND

This application relates to data management and display.

The amount of data that can be processed and stored by one or more computers has grown multi-fold over the last few years. The explosive growth in the data managed and processed by computers can be witnessed in application areas such as web servers, e-commerce servers, financial databases, multimedia content servers, and so on.

SUMMARY

The present document describes techniques for organizing display of large, complex data to a user. A user is able to navigate through data by applying various data classification criteria. After the application of a category, the data display can be updated in vertical or horizontal directions to display an attribute of the data that meets the applied criterion.

In one aspect, techniques are provided for providing visualization data to a client device. A server is controlled to generate a plurality of display objects for selectively displaying at the client device to a user, wherein each display object comprises at least one of a data portion and a graphics portion. Using the server, the plurality of display objects are assigned to a plurality of vertices organized as a logical display tree. The server is controlled to create a mask specifying visual characteristics of the plurality of vertices, wherein the visual characteristics of a given vertex simultaneously controls display attributes of all display objects assigned to the given vertex. The server is controlled to transmit a description of the plurality of display objects, the logical display tree and the mask in a payload format.

In another aspect, techniques are provided for displaying data on a user interface. A description of a display tree comprising a plurality of vertices, wherein each vertex has one or more associated display objects is received. A mask defining a visual characteristic of each vertex in the plurality of vertices is received. The visual characteristic of a given vertex is applied to all display objects associated with the given vertex. Visual information described in the description is displayed on a user interface screen in a manner consistent with the visual characteristics described in the mask.

In yet another aspect, a method of providing visualization data to a first client device and a second client device includes generating a plurality of display objects that can be displayed by the first and the second client devices, wherein each display object comprises at least one of a data portion and a graphics portion, organizing the plurality of display objects into a plurality of groups, with display objects in a group sharing a common display characteristics, transmitting a description of the plurality of display objects and the plurality of groups to the first and the second client devices, selectively updating a first display object based on the common display characteristics of the first display object, selectively transmitting, based on the common display characteristics of the an updated description to the first client device and the second client device, and transmitting an updated description to the first client device and the second client device by including information about the updated first display object.

The details of above aspects and their implementations are set forth in the accompanying drawings, the description and the claims.

BRIEF DESCRIPTION OF THE DRAWINGS

Figure 1:
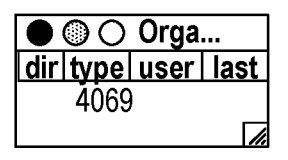

FIG. 1 is an example screen shot of a data browsing graphical user interface (GUI).

FIG. 2 is an example screen shot of a menu for data browsing.

FIG. 3 is another example of a data browsing GUI.
FIG. 4 is another example of a data browsing GUI.
FIG. 5 is another example of a data browsing GUI.
FIG. 6 is another example of a data browsing GUI.
FIG. 7 is another example of a data browsing GUI.
FIG. 8 is another example of a data browsing GUI.
FIG. 9 is another example of a data browsing GUI.
FIG. 10 is another example of a data browsing GUI.
FIG. 11 is another example of a data browsing GUI.
FIG. 12 is another example of a data browsing GUI.
FIG. 13 depicts a GUI control widget.
FIG. 14 depicts a GUI control widget.
FIG. 15 depicts a GUI control widget.
FIG. 16 depicts a GUI that provides visual menu indication to a user.
FIG. 17 is another example of a data browsing GUI.
FIG. 18 is another example of a data browsing GUI.
FIG. 19 is another example of a data browsing GUI.
FIG. 20 is another example of a data browsing GUI expanded along multiple directions.
FIG. 21 is another example of a data browsing GUI expanded along multiple directions.
FIG. 22 is another example of a data browsing GUI expanded along multiple directions.
FIG. 23 is another example of a data browsing GUI.
FIG. 24 is another example of a data browsing GUI expanded along multiple directions.
FIG. 25 is another example of a data browsing GUI expanded along multiple directions.
FIG. 26 is another example of a data browsing GUI.

DETAILED DESCRIPTION

Figure 27:
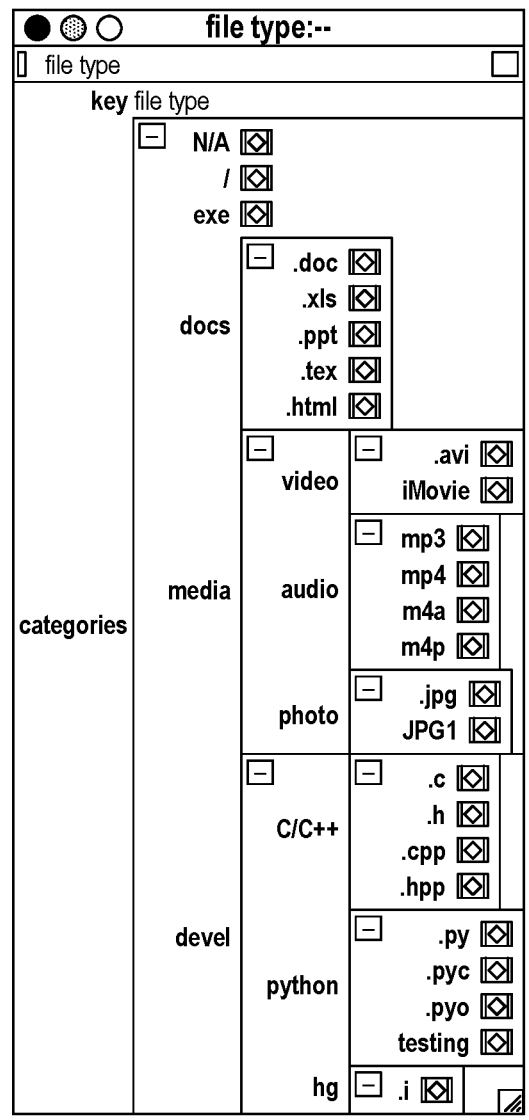
FIG. 27 is another example of a data browsing GUI.

Traditional data visualization programs such as Microsoft Excel provide a functionality-rich software application for users to store, manipulate and visualize data. However, these techniques are typically designed for use by a single user and do not generally allow simultaneous read/write access by multiple users. New document and data sharing techniques such as GoogleDocs, on the other hand, provide a solution for data viewing/editing by multiple users but often are provided limited functionality.

Furthermore, shared data viewing techniques such as GoogleDocs do not provide for mechanisms that provide multiple views of the same data to multiple users. For example, when users A and B are editing a GoogleDocs document, another user C can either participate or observer the changes, but cannot independently be working on the same data. In addition, the data sharing experience is not typically adjusted to be specific to a user's hardware platform.

The techniques disclosed in this document address the above-discussed limitations and others. In one exemplary aspect, a data transfer format called ROST (reference/optimistic/screen/typed value) is disclosed. Example advantages offered by the ROST format include reduction of data bandwidth when transferring a data view from a server to a client, the ability to perform fast refreshes at the server-side, supporting data view sharing by multiple users, resolving conflicts among data edits when multiple users attempt to concurrently change value of a given data field at the server, and so on.

The techniques disclosed in this document further facilitate viewing of data by multiple users based on synchronized views. The synchronized views may be used by one set of users while another set of users may be independently able to work on the same data.

In yet another example, the disclosed techniques allow for synchronized viewing by multiple users using client devices having different display capabilities. The ROST format, e.g., allows for client device-specific viewing of data to each user. These, and other, aspects are further disclosed below.

The techniques described in the present document can be implemented on a user's client devices using a Javascript or AJAX or similar platform. For example, the disclosed functionalities may be downloadable to a user device as a web browser plug-in or may be installed at a user device as an application (e.g., a Python application). In some implementations, no special installation or download at the user device is performed, with the functionalities simply relying on user device's HTML5 or Javascript compatibility.

Examples and implementations of techniques are provided for organizing data that includes multiple related records, and presenting the data according to a user's viewing choices are described. In some disclosed embodiments, data is classified using two or more hierarchical classifications. A user is presented with data based on a first level of break down, or data classification, specified by the user. The data thus presented can be further broken down into a second level of break down. In some disclosed implementations, the second level of break down can be accomplished either in a horizontal direction on a graphical user interface (GUI) or in a vertical direction on the GUI. The software tool that enables the above functions for browsing large sets of data based on multiple criteria is referred to as an Organizer.

Techniques are disclosed to simplify the task of browsing through large sets of data items. The disclosed graphical tool combines the visual and interactive advantages of tree and table displays. Visual cues are provided to a user to help with browsing of data on a computer platform that includes a processor and a display.

Large quantities of data, including text and numbers, can be presented as expandable lists (sometimes called trees) in which a list can be condensed to a top level headers (e.g., for a Microsoft Word file in the "document map" format). The top level headers can be individually expanded to reveal additional data, which is further expandable to additional levels. While the expandable lists offer a convenient way to manage data complexity by allowing a user to selectively zoom into data, such data expansion is limited to opening/closing additional data underneath a level in a single direction (typically vertical). Furthermore, there is no provision to apply multiple different classifications to achieve expansion of a list. When a user action desires expanding/collapsing data below a certain level, the additional data includes data that fits one category only. It is not possible in various existing, conventional or other software systems to achieve the expansion/collapsing based on multiple data attributes.

Complex data can also be presented to a user using a technique that is sometimes called "a pivot table." A pivot table can automatically sort, count, total or give the average of the data stored in one table or spreadsheet and display the results in the form of a second table called a pivot table. However, the depth of data sorting, or the level to which a user can dive into data, is only one layer deep in the pivot table technology.

With the emergence of complex computer systems and storage devices that can store large amounts of data, there is an ever-growing need for data classification, sorting and presentation to a user. The traditional tree/pivot table techniques fall short of addressing today's needs to be able to classify and present large quantities of data efficiently.

In the present document, examples of implementations of the described techniques are disclosed for organizing, categorizing and displaying data to a user. The disclosed techniques can be implemented on a user's computer, at a web server, or any other user device such as a tablet, a smartphone, a notebook computer, etc. In some implementations, the techniques may be used to transfer data between a server and client device and used to provide views of the data to a user.

As a non-limiting example, in some implementations, the disclosed technology could be used at a e-commerce server that offers thousands of catalog items for sale. Using the disclosed techniques, e.g., a user accessing the e-commerce server over the Internet, may be able to quickly sort through available merchandise using applying multiple classifications.

As another non-limiting example, in some implementations, an individual investor, or an investment professional, may be able to sort through financial data using various search criteria (e.g., price to earnings ratio, closing stock price, profit growth, market cap value etc.), by applying these criteria to a database of financial data.

Visually browsing large sets of data items is commonly performed. Just a few examples are: files on a computer, articles for sale on an online retailer's web-site, a person's credit card transactions for the past year, a factory's inventory. While database systems are a common solution for storing and querying data, presenting information in human readable form is a different task.

Two common ways to visualize data items are "tree+filter" and table. An example of "tree+filter" is browsing items on an online store: products are grouped by nested categories, and the view can be restricted by using various criteria. For a table display, each line and column represents a category, and the table shows some information regarding the items that match each line and column combination. Both ways can be unsatisfactory, particularly for large, complex sets of items.

Many limitations of current displays stem from giving some criteria preferential treatment, which often leads to relying primarily on one visual format. Computer files e.g. are easier to see by location than by other characteristics, and are not commonly shown as a table: it is not known in advance which attributes should be used for rows and columns.

Specifically, a graphical tool is provided for browsing data sets subject to any number of criteria. In one aspect, the graphical tool combines the visual and interactive advantages of tree and table displays, and allows the user to break down data by prioritizing criteria himself, with none privileged a priori. Aggregate measures for sets of items matching desired combinations of characteristics are easy to obtain. The disclosed examples for implementing the Organizer pertain to visually browsing data items and include, among others, the following aspects or features, (1) the techniques for data the Organizer works with; (2) user interaction including features of what a display user interface look like, and commands that can be given, and effects of such commands; (3) how a state of the display user interface is represented, either for volatile (memory) or permanent storage (disk or equivalent); and (4) the effect of commands on the display representation.

In the following sections, section numbers are used for the ease of understanding and cross-referencing.

1. Examples of Browsing Data Using Multiple Criteria

The approach relies on combining a number of insights:

Many classification criteria can be manipulated in a uniform way by regarding them as directed graphs, a generalization of tree graphs.

A display composed of nested tables can be kept intelligible with proper formatting (colors, borders, alignment, etc.).

The interaction between data items and visualizations can be simplified by using aggregate measures for subsets of data.

Nested arrays are suitable for representing combinations of directed graphs.

1.1 Criteria and Categories

For understanding the disclosed techniques, one start by analyzing characteristics independently of particular data sets. As it is not practical to enumerate all potential uses, it makes sense to look at a characteristic's intrinsic properties, with the understanding that data may or may not have it. For example, zip codes are applicable primarily to addresses, but things like parks or average daily temperatures possess locations as well; it would be incorrect to assume that zip codes are a characteristic of addresses only. If technically needed, an N/A category can be added to handle items for which the characteristic does not apply.

Zip codes exhibit a common problem: at approximately 43,000 of them, it is hard to make use of one without some looking up. However, zip codes are not random numbers; grouping of them into regions, states, counties, cities etc. can be used to make sure that at every level there are sufficiently few categories. This is helped by the fact that someone who is looking at the sub-categories of Chicago is likely to know what River North is.

Another example of a human-usable characteristic is time. With 2000 years being approximately 63 billion seconds, referring to event times by second alone is feasible for computers, but not humans. The solution is calendars and clocks, based on groupings into centuries, years, months etc. With no group too big, everyone can easily read and understand dates and times.

This grouping approach can be formalized by using directed graphs, a well understood mathematical notion with many applications to computing. A directed graph is a set of vertices, some of them connected by arrows.

Figure 28A:
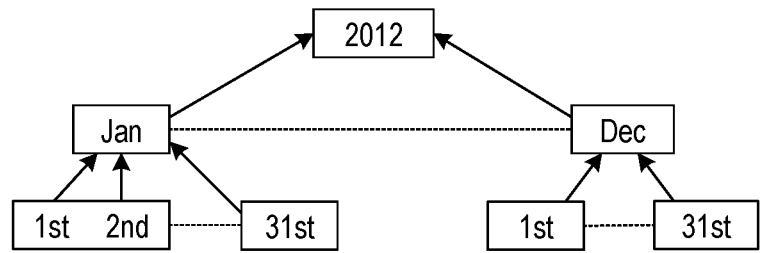
FIGS. 28A, 28B and 28C depict example relationships among data attributes.

For example FIG. 28A, represents a 2012 calendar as a directed graph. The vertices of the graph are referred to as categories and arrows join sub-categories to each parent category. If y can be reached by arrows (perhaps 0) from x, x is said to be narrower than y, and that y is said to be broader than x (by convention x is narrower/broader than itself). For example, Jan 1st is narrower than 2012, without being its sub-category. Finally, the depth of a category is the minimum number of arrows needed to reach the top category.

Figure 28B:
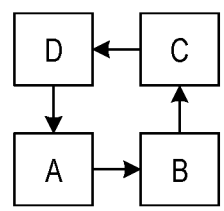

Throughout this description a criterion will refer to a classification characteristic that has been organized as a directed graph. A directed graph has a top category conventionally named all, and that it contains no cycles. Graphs like (FIG. 28B) are disallowed, as they do not model progressively narrower categories useful for classification.

Figure 28C:
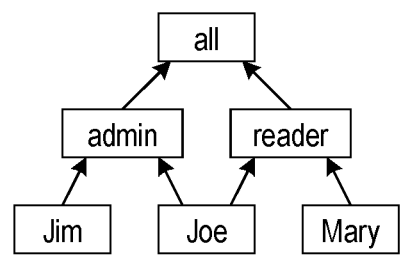

The reader already knows many examples, as tree graphs fit the above requirements, and have the additional property that every category belongs to a unique parent category. Files organized by directory, dates and times, and zip codes as above, are all trees. Not every criterion is a tree. Consider the classification of users of a website illustrated in FIG. 28C: with Joe both an administrator and a reader, this criterion is not a tree.

Turning a characteristic into a good criterion may benefit from an understanding of its intended use. A representative example is the calendar, which is not just an arbitrary breakdown of seconds, but also relates months to seasons, days to daylight etc. In many cases criteria incorporate domain knowledge and significant work; the Organizer derives value from allowing that work to be easily shared.

1.2 Multi-Descriptions

Some presently disclosed techniques use criteria in combination. A choice of one category from each criterion under consideration will be called a multi-description, and be denoted $\{crit_1: cat_1, crit_2: cat_2, \ldots\}$.

Multi-descriptions delimit subsets of data. In FIG. 11, the 59 files that are directories, sit under GUIkit and were last changed in 2012, share the multi-description {dir: GUIkit, type: /, user: all, last: 2012}. Another use of multi-descriptions is specifying changes to the display. The transition FIG. 10→FIG. 11 breaks down the multi-description {dir: GUIkit, type: all, user: all, last: all} by the last criterion.

A multi-description x will be said to fit another multi-description y if every criterion's category appearing in x is narrower than the same criterion's category appearing in y. Equivalently, x is narrower than y and y is broader than x. The depth of a multi-description will be the sum of the depths of the categories comprising it.

1.3 Nested-Table Displays

A nested-table display can be structured to include rectangular arrays and each array includes a total and a breakdown. The breakdown can be 1-dimensional (vertical or horizontal) or 2-dimensional. Numbers and labels can be arranged and formatted in a way that makes obvious what is a total and what is a breakdown, even when there are quite a few arrays.

One possible formatting scheme is used in the figures. Labels, rather than sub-aggregates, are aligned with the total, and different colors insure labels and values cannot be confused. When a child array is created, rows and columns are enlarged appropriately to maintain the alignment of parent arrays.

To make breakdowns visually distinct, they are enclosed in a border and given a different background color, with the exception of a breakdown that has no data, in which case a dash is displayed with no border, using the parent's background color. The breakdown background color loops through 4 shades of gray, which keeps adjacent areas distinct, without using too many colors. Labels, values and the hide/include category colors (see Section 3.2) seen clearly on these 4 shades of gray; light blue, white, orange and black work well.

Besides the rectangular array, the nested-table display generalizes the tree display, which can be simulated using 1-dimensional vertical breakdowns alone. That can be seen in FIG. 27, albeit with different formatting.

1.4 Data Items and Aggregate Measures

The purpose of working with criteria is to apply them to data sets. The two are linked via a computer-performed calculation that, for each criterion and data item, provides the category the data item belongs to. For uniformity, if a data item is not related to a criterion, a simple function that returns all or N/A can be used.

Given a data item x, a multi-description $m_x$ can be obtained by performing this calculation for every criterion under consideration. $m_x$ can be used to decide whether the item belongs to a set defined by a multi-description d, by checking if $m_x$ fits d. This can be done via known algorithms for directed graphs.

In some cases a data item belongs to more than one category, e.g. a rain jacket sold under both casual and mountaineering wear. In that case, what is obtained is not one multi-description $m_x$, but a set of multi-descriptions, one for each combination of the several categories the item belongs to for each criterion. In this case, the item fits a multi-description d if at least one of its associated multi-descriptions fits d.

When working with large sets of data, a user tends to be interested in an overall characteristic of the set rather than individual items. Such overall characteristics are referred to as aggregate measures. Related to e.g. inventories, some familiar aggregate measures are total cost, total weight, and average time since purchased. Given a multi-description d, a data item set and an aggregate measure, an aggregate can be computed for the items whose multi-description fits d. All display values are aggregates.

Some aggregate measures are applicable to all data sets. The number of items in the set is an important one, often of interest. Another is whether the set is empty or not. While more abstract, it helps better reproduce tree displays with nested-table displays. Tree displays often show a ⊞ when there are items underneath, but not otherwise. This can be replicated using the empty-or-not aggregate measure, and displaying ⊞ or ⊡ appropriately.

1.5 Putting it Together

Nested-table displays are suited to working with multiple criteria. This is easiest shown on a concrete case, e.g., the transition FIG. 9→FIG. 10. For that transition, the type criterion was dropped onto the 426 files under the GUIkit and devel categories, i.e. the files that fit the multi-description d={dir: GUIkit, type: devel, user: all, last: all}. As they are all devel files, breaking down again by type shows the sub-categories of devel: C/C++, python and hg (which can be seen in FIG. 27). For each sub-category, a new multi-description can be obtained from d by replacing devel, and an aggregate measure computed. The display is updated by adding a 1-dimensional, horizontal breakdown.

Generalizing, a state of the display is represented by a tree with one vertex for each aggregate shown. For example, the tree that generates FIG. 2 has a root vertex with 33 children, one for each line in the breakdown. Each vertex can contain:

The aggregate's multi-description.

Criteria assigned to the horizontal and vertical directions, if any. There are 3 possibilities:

The vertex has no criteria associated with it. Such a vertex will have no further breakdowns, and will be a leaf of the tree (no descendants).

The vertex has exactly one criterion associated with it. Such a vertex will have a 1-dimensional array of child vertices indexed by the sub-categories of the category of the assigned criterion appearing in the multi-description of the vertex. Geometrically, the child aggregates will be arranged along the direction the criterion was assigned to. Child multi-descriptions are obtained by replacing the appropriate sub-category in the multi-description of the vertex.

The vertex has both a horizontal ($C_H$) and a vertical criterion ($C_V$) assigned. Denote by d the multi-description of the vertex. The child vertices will form a 2-dimensional array indexed by pairs of subcategories ($s_h$, $s_v$), where sh spans the sub-categories of the category $c_h$ of $C_H$ appearing in d, and $s_v$ spans the sub-categories of the category $c_v$ of $C_V$ appearing in d. Geometrically the new aggregates are displayed in a 2-dimensional array, with column labels provided by $s_h$ and row labels provided by $s_v$. Child multi-descriptions are obtained from d by replacing $c_h$, $c_v$ with $s_h$ and $s_v$.

Whenever a criterion is assigned or unassigned, the vertex is recomputed and all child vertices are discarded. Any breakdowns in child vertices will be lost. If one criterion of a 2-dimensional breakdown is unassigned, the breakdown becomes 1-dimensional.

To interact with the display, commands to assign a criterion to a direction of an aggregate, and to undo a prior assignment, are needed. For some sample interface examples, described herein, this functionality consists of the D+ and D-commands, with the limitation that a drop only works if the desired breakdown direction is free. To avoid confusion regarding figures, the sample interface may incorporate the features described with respect to "resolving drop conflicts."

2. Additional Example Refinements

While the discussion above describes some implementation examples, a number of variations are possible, each requiring some degree of work and insight. The sample interface described herein incorporates some, but not all of the features below.

2.1 Displaying Item Lists

Besides displaying aggregate measures, it may be useful to display the items comprising an aggregate. An example interface for this are the L+ and L−commands, with effects occurring in FIG. 15, FIG. 16, FIG. 17 and FIG. 18. A way to store this information is given by "aggregates currently displayed list" feature disclosed below.

2.2 Simplifying the Display

By design, the number of sub-categories of a category in a criterion should be kept small for the display to be easily read.

Even so, not all the data may be of interest. A solution to simplify the display is to designate categories as included or hidden. A hidden category will not be shown, and its items will be excluded from aggregates and item lists.

To be precise, for aggregates below the breakdown where the hiding takes place, the display should behave as if the arrow in the directed graph, going from the hidden category to its parent category appearing in the breakdown's multi-description, has been severed. While for a tree, items fitting the hidden category will no longer be tallied in the aggregate, for a general directed graph that is not true; narrower categories can be reached more than one way.

A possible user interface for managing included/hidden categories consists of the editing commands in Section 3.2. For examples, refer to FIG. 3, FIG. 4, FIG. 5, FIG. 6, FIG. 7, FIG. 8 and FIG. 9.

Another way to reduce the complexity of the display is provided by restrictions, which allow the display to behave as if the set of items was reduced to those matching a multi-description. Any visible aggregate can be used to restrict; the relevant Section 3.2 commands are R+ and R−, put at work in FIG. 12, FIG. 13, FIG. 14, FIG. 15, FIG. 16, FIG. 17, FIG. 18 and FIG. 19.

To implement these two features, the editing and restriction information can be be stored as part of the display state. For one convenient way see Section 2.5.

2.3 Resolving Drop Conflicts

It can be desirable to perform more than one breakdown with a single command. As an example, look at the D+ command used to reach FIG. 11. Its intent is to break down all the aggregates on the GUIkit line using the last criterion. This requires 3 break-downs, resulting in a 1-dimensional array for the first two columns, and in converting a horizontal 1-dimensional array into a 2-dimensional one for the third.

If one command can result in multiple breakdowns, a feature is to be able to revert. For D-to accomplish the transition FIG. 24→FIG. 25, it becomes desirable to represent how breakdowns are related.

Complex cases can occur. If the breakdown into C/C++, python and hg in FIG. 11 had been vertical, the additional last breakdown could not have been done directly, as the vertical direction is already occupied. Passing it down to children works, but creates further complications. Should the C/C++, python and hg breakdown be removed, the conflict disappears and child breakdowns would have to be consolidated. It is not clear how that should be detected.

One way of avoiding representing such complex relationships is to keep track only of desired drops, which are breakdown commands by the user, and translate them into applied drops, corresponding to displayed breakdowns. A desired drop can result in several applied drops, as seen above (FIG. 11). No applied drops is also possible, when the desired drop was based on the results of another desired drop that was later removed (e.g. FIG. 25→FIG. 26).

A desired drop can be characterized by the following:

target: The multi-description of the aggregate or label onto which the criterion was dropped.

direction: Horizontal or vertical.

criterion: The criterion that was dropped.

index: A unique integer number for every drop; earlier drops have lower numbers.

The relationship between desired drops and applied drops can is defined by 3 aspects:

No desired drop is applied above its target.

Every desired drop is applied once to data that fits its target. More precisely, every aggregate that is not broken down, and whose multi-description fits the target of a desired drop, have one applied drop coming from that desired drop, above it in the tree.

A desired drop is passed on to children only if it conflicts with a higher priority drop. Two desired drops conflict if they have the same direction or the same criterion, as they cannot be displayed correctly by a rectangular table of values with labels on the outside. Preference is given to drops with low target depths; for equal depths, a lower index will be applied first, i.e., the earlier drop.

Based on the desired drops, a tree in which every vertex corresponds to a displayed aggregate can be constructed iteratively. A vertex will have its own breakdown and child vertices if it has any applied drops. Visually the result looks the same as for Section 1.5; the difference is, in essence, that in Section 1.5 applied drops are managed by the user interface directly, while here they are computed from desired drops.

Each vertex in the tree is characterized by:

content: A multi-description. Data items that fit the content are tallied in its aggregate.

applied drops: 0, 1 or 2 drops. They determine if the vertex is a single aggregate, a 1-dimensional breakdown, or a 2-dimensional breakdown. If there are two drops, they cannot conflict (see requirement (B) above).

For each vertex v in the tree, the following sets of drops are computed:

I(v): The set of inherited drops that children of v tries to accommodate.

P(v): The set of potential drops that might be needed below v. These are desired drops, for which v's content does not fit the target. As such, by requirement (A) these drops cannot be applied yet.

F(v): The set of found drops, potential drops of the parent which, absent conflicts, could be applied at v. Found drops are a subset of the required drops.

R(v): The set of desirable drops that are to be applied to v or all its children.

U(v): The set of redundant drops, which have not been applied yet but have become redundant at v or below.

A(v): The set of applied drops, which will be used for the break-down at v.

The calculation starts with a single vertex root, whose content consists of criteria's all categories. For each vertex v, the above sets are computed from the sets P(p) and I(p) belonging to its parent p; in the case of root, the set of desired drops and the empty set are used instead of P(p) and I(p). The iteration rules are:

F(v) will consist of the drops in P(p) with target broader than the content of v.

R(v) will be I(p) together with F(v).

U(v) will consist of the drops in R(v) for which the category in the content of v corresponding to the drop criterion has no sub-categories.

A(v) will consist of however many drops from R(v), not in U(v), can be accommodated without conflicts, taken in the priority order (see requirements (B) and (C) above).

I(v) will consist of the drops in R(v) that are not in A(v) or U(v).

P(v) will consist of the drops in P(p) not in F(v).

After computing the above sets for a vertex v, its children are computed based on A(v). With no conflicts among them, there can be at most two drops. The cases mimic those of Section 1.5:

A(v) is empty. The vertex has no children.

A(v) consists of exactly one element. The children will form a vector indexed by the sub-categories of the category in v's content corresponding to the drop criterion.

A(v) consists exactly of two elements. The children will form a 2-dimensional array.

This construction meets requirements (A), (B) and (C) above, and it can be shown that any other calculation satisfying (A), (B) and (C) will produce the same results.

With this approach, reverting a drop is accomplished by simply deleting it from the desired drop set, and the consequences are figured out by the calculation above.

2.4 Mixing Aggregate Measures

It is desirable to be able to mix more than one aggregation measure in the same display. For example, after isolating a number of files by looking at file counts, the user could see how much the disk space they occupy by switching the aggregate to show disk space.

Aggregate measure drops can be represented by a triplet (target, aggregation measure, priority), similar to the description of desired criterion drops. The calculation of Section 2.3 can be adapted as follows:

Measure drops do not conflict with each other, or with criteria drops.

Measure drops do not cause the creation of child vertices.

Applied measure drops are left in the set of inherited drops, as they need to be applied to all child vertices.

Of the measure drops applied to a vertex, the display will use the one with least priority. This means the measure with the deepest target, or in the case of equal depths, the most recent one. Switching an aggregation measure will change child vertices, unless they have aggregate measure drops of their own.

The user interface could have a list of aggregation measures at the top of the display, and allow aggregate measures to be dropped wherever a criterion can be.

2.5 Adapting the Display to Changing Data

In most realistic situations data is dynamic. Consider a tool to browse the articles available on an online store. When a display is saved for later use, if available articles or their categorizations change, the display will be lost unless it can be adjusted. The purpose of this section is to present a storage format that, in addition to supporting the features discussed so far, can be adjusted after changes in the data set, among the categories within criteria, and of the criteria list itself.

An instance of the storage format, called a display state, is comprised of the following:

Desired drops: For each drop, the following are stored:
target: A multi-description, see Section 2.3.
criterion: The breakdown criterion.
direction: The breakdown direction, one of horizontal or vertical.
index: A unique integer. Earlier criterion drops have lower numbers.
hiding data: Information about included/hidden categories. All occurrences of a category produced by a desired drop are hidden together. An example would be hiding one of the three 2012's in FIG. 11, making all 3 disappear.

Aggregate measure drops: Each consists of:
target: A multi-description, see Section 2.4.
measure: The aggregate measure.
index: A unique integer. Earlier measure drops have lower numbers.

Aggregates currently displaying item lists: Identified by the aggregate's multi-description.

Sets of categories currently under edit: Identified by the brake-down's multi-description, and the set's geometric direction.

Restrictions: Represented similarly to aggregate measure drops, each consists of:
target: A multi-description.
index: A unique integer. Earlier restrictions have lower numbers. The above restriction data can be processed as the tree of aggregates is constructed, and a sequence of multi-descriptions, each narrower than its predecessor, computed. The display can be adjusted based on this sequence.

As the display state does not reference data items, it can be updated for changes in data by simply recomputing it. For criteria and category changes, the adjustment is as follows:

Add a criterion: All multi-descriptions used throughout the display state representations can be extended with the all category of the new criterion. This creates a display state compatible with the new criterion list.

Remove a criterion: Any criterion drop, measure drop, restriction, edit, or item list expansion, that contains a multi-description referencing any category of the deleted criterion other than all, is deleted.

Add categories: A new category can not appear in existing multi-descriptions. It does however need a choice of hidden or included, and either is valid.

Remove categories: Again, display state components containing multi-descriptions that reference a category that no longer exists are deleted.

Importantly, the above adjustments produce a correct display state because there are no constraints among components. This is a key feature of the display state format, and of the calculations that render the display based on it.

2.6 Minimizing Clutter

With many nested tables, the display can get complicated, and it helps to keep buttons and other non-essential features to a minimum. A system of drag-and-drops and context sensitive cursors makes the interface intuitive, visually simple and less error prone. The same drag-and-drop works with both horizontal and visual breakdowns, and the user knows which will occur before a drop is performed (see Section 3.2). Likewise, distinct cursors for restriction and undoing drops make things easier.

2.7 Filtering

Range filtering is useful when browsing data. For example, one could be interested in files changed from March 2009 through February 2012. While this can be accomplished by hiding sub-categories, it is tedious.

While in general a criterion does not have a natural order, trees in which every category's sub-categories are ordered can be used to define ranges. This is the case for numerical criteria, such as time. The order is not entirely free of convention, as for example one has to decide whether a year comes before its January sub-category, after its December sub-category, or somewhere in between. While before is quite reasonable, the user will have to remember that 2009 date 2012 means 1/1/2009, . . . , 12/31/2011. Ordering trees is a well understood topic in the prior art.

Filters can be stored similar to included/hidden category choices.

3. Example User Interfaces

Example user interfaces are described through a file browsing example.

3.1 Display Elements

Visually the display is composed of one or more of the following elements:

criterion: Available criteria are shown at the top.

category: Labels for rows and columns. Shown in light-blue if not being edited, and orange/black in edit mode.

aggregate: The aggregate value of items that match a combination of categories. Shown in white. For the file example, it is the number of files (see Section 1.4).

total: The aggregate for all data items under consideration. It is the very top-left value.

item list: A list of the data items comprising an aggregate.

3.2 Summary of Commands

Here are the commands supported by the sample interface, with a mnemonic in parenthesis:

(D+) Drop: Drag and drop a criterion on a aggregate or category. When hovering over the drop area, the cursor will change to 4 or showing the direction that will be used for the breakdown.

(D−) Undo Drop: Drag and drop a category to any aggregate. The cursor will be x.

(L+)/(L−) See/hide item list: Click on aggregate.

(R+) Restrict total: Clicking in the upper-left area of an aggregate causes the aggregate to become the new total. The hovering cursor is ☐.

(R−) Undo restrict: Press Escape key. Removes the most recent restrict.

Editing categories: Each category can be excluded from aggregates and hidden from view. Included categories are shown in orange, hidden ones in black. Items from excluded categories are filtered out of any item lists.

(E) Edit: Click on a category. Aligned categories will be edited as well.

(Q) End edit: Press Enter. Saves include/hide selections for the entire display.

(i)/(h) Include/hide one category: Click on category.

(I)/(H) Include/hide all categories: Press Equal/Minus key. Affects all categories under edit.

3.3 Screen-Shot Sequence

The sequence will demonstrate browsing files organized by four criteria: location (dir), type of file (type), owner of file (user), and date when the file was last accessed (last). The aggregation measure in this case is the number of files matching a combination of categories. At the start, the display shows the criteria and the total number of files:

To see the breakdown of files by directory, the dir criterion can be dragged and dropped over the total (D+ command). If the drop is towards the left/lower corner of the total, the cursor will show 4, and the breakdown will be displayed vertically, as seen below:

To add a breakdown by file type, the type criterion is dragged and dropped towards the right/upper corner of the total (D+ command). The cursor changes to ⇒. The display becomes a table with directories as lines, and file type categories as columns:

The user might not be interested in all sub directories. Sub directories (categories in general) can be hidden. The first step is to click on a category, e.g., econBoost (E command). This will put econBoost and its sister categories in edit mode; categories will be shown in orange or black, depending on whether they are included or hidden. In this case all categories are included:

If only a few sub-categories are of interest, the user can hide all sub-categories first by pressing the minus key (H command). Excluded categories show up in black:

To add individual categories back, the user can click on them (i command) in turn. The total will update after every change:

The Enter key exits the edit mode (Q command). The display now shows only the included categories:

Columns also can be hidden. After clicking on any column label, e.g. exe (E command), clicking on any included category hides it (h command). In this example N/A, docs and media were hidden:

The Enter key again exits the edit mode (Q command). Drops (D+ command) can be applied to any aggregate, not just the total. Applying type horizontally to the files that match both the GUIkit location and the devel file type (the number 426) will expose the sub-categories of the devel.

Drops (D+ command) can also be applied to a label, in which case a breakdown will be performed for all aggregates under that label. Here the last criterion was applied to GUIkit vertically:

It is possible to restrict the total to an aggregate. In this case the 103 python files last changed in 2012 were chosen, by clicking in the upper left corner of the aggregate (R+ command). While hovering around the upper-left corner, the cursor becomes ⬉. The display simply shows that aggregate as a total, maintaining the coloring:

Drops can be performed after restricting. Here the user criterion was applied (D+ command):

Successive restrictions are possible. Here the total was again restricted to the 103 files belonging to the user andrei (R+ command):

Drops can still be performed after successive restrictions. Here the last criterion is applied again to the 103 files (D+ command), showing months as the sub-categories of 2012:

The list of items comprising an aggregate can be displayed at any time by clicking on the aggregate (L+ command). The list is shown with a scroll bar, and the surrounding display is expanded to make room for it. In this example the 19 files for November are shown:

Restrictions can be undone, starting with the most recent one (R-command), by pressing the Escape key. The display maintains all other properties, e.g., the item lists displayed.

The list of items for an aggregate can be hidden by clicking again on the aggregate (L-command).

Undoing restrictions can continue as long as there are any remaining. Here Escape removes the first restriction (R-command), showing the full display:

The visual layout constructed for a category is remembered if a category is hidden.

The first step to demonstrate that is putting GUIkit and its sister categories in edit mode, by clicking on GUIkit (E command). Both hidden and included categories are shown:

Clicking on GUIkit again hides it, and the color turns black (h command):

Hitting the Enter key (Q command) exits the edit mode, and the line corresponding to GUIkit disappears:

GUIkit can be restored by clicking on any of its sister categories, e.g., econBoost (E command) and then on GUIkit (i command):

Enter again exits the edit mode (Q command), and hidden categories disappear:

As it can be seen, the visual details of the GUIkit line have been preserved.

Drops can be undone (D-command). This is done by dragging any category that resulted from that drop onto any aggregate. For example, dragging the 2012 under GUIkit and/onto the 59 to its right removes the drop of last over GUIkit that led to FIG. 11. That drop caused breakdowns in 3 places (see FIG. 11), and all those break-downs are now removed together. This is important, as it would be tedious to revert all break-downs caused by a single drop one by one. The breakdown of 103 by user also disappears, as that relied on the category 2012 which became visible as a result of the drop now being reversed. The same applies to the break-down by months resulting from applying last to the 103 files belonging to andrei.

The breakdown of GUIkit and devel by type survives, as it did not rely on the breakdown by last which was just reverted. A further D-command by dragging utils onto the aggregate 9 to its right leaves the display with a breakdown by type (some categories still hidden):

Another D-command returns the display to the initial state of FIG. 1.

An Example Remote Visualization Framework

The present document also describes a remote visualization framework that allows for visualization of hierarchically complex data. Only for the ease of explanation, the framework is referred to as "QE View." However, it is to be understood that different embodiments that mix and match the disclosed features are possible.

In some embodiments, the visualization framework may focus on multi-user interaction and provide a highly responsive user interface. Web pages do not naturally fit this task, and any good solution faces data consistency and hardware differentiation challenges.

QE View separates visualization data into the hardware-specific and hardware-independent portions. The latter permits asynchronous updates, enabling real-time interaction among users, as well as handling many client events optimistically. The result is a responsive, real-time user interface, even with communication delays.

While the concepts behind QE View are not web-specific, they can be used in conjunction with web technologies such as AJAX and HTML5. This affords familiar advantages, such as sharing views as links and eliminating software downloads.

For some data, complexity stems from nested components, with each component relatively simple. Examples abound: investment portfolio, engineering designs, store and plant inventory, many scientific models. By contrast, other types of data, e.g., video content, have no identifiable components. Yet another possibility is exhibited by Wikipedia: while there are components, there is no natural hierarchy.

Not surprisingly, different types of information require different tools. Web pages are not naturally suited to hierarchical data, but fit Wikipedia extremely well. QE View is similar: while it is intended for hierarchical information, it can work with other data, albeit providing with fewer benefits.

A revealing example is Google Earth. Determining the content of a map fits under the mask concept (Section 7.1), and QE View could be used to provide multiple users with real-time interaction. However, whatever the demand for such a feature, it represents only a small fraction of the overall usefulness of the product.

Hierarchical data has specific visualization needs. Even more so than complex information in general, the screen layout is important, and should not be discarded when an application quits. Many applications (e.g., Bloomberg Launchpad and the Eclipse IDE) go beyond one step further, and provide different layouts for various tasks.

Handling visual information becomes more difficult in a multi-user setting, as asynchronous changes can cause inconsistencies. Supporting different hardware adds to the challenge; window positions acquired from one computer are not useful on a smaller monitor or mobile device. As a result, retaining visual information is uncommon for web applications, despite their having acquired many of the advantages of stand-alone applications via technologies such as AJAX.

QE View handles these difficulties. Its features are, among others, to:

(1) Provide a highly responsive user interface.
(2) Allow saving display layouts.
(3) Enable real-time, multi-user interaction.
(4) Work with different hardware.
(5) Be efficient with respect to network traffic, memory requirements, and compute time (there are tradeoffs).

The benefit for using QE View in an application is proportional to its hierarchical complexity and degree of interactivity. While these requirements are more common in the commercial sector, many retail concepts fit to considerable degree. On-line store's inventory and product information, airline reservations, managing personal information, credit card statements are a few examples.

Concretely, QE View is a development framework. It exposes a set of classes that can be customized, and provides a client-server application for conforming data. The intent is that most complex aspects are isolated by the framework, resulting in a straightforward development process. Terminology-wise, the methods of a provided class that are to be implemented by any derived class, or likely to be customized, will be called the inteface of the class.

4.2 Example Ideas Behind QE View

QE View's basic approach to hierarchical complexity is expanding and collapsing objects. This is both simple and not new; what is original is realizing that by using a suitable storage format and adequate event handling, it can be made scalable, efficient and highly interactive, as well as compatible with small-screen devices, thus becoming an effective alternative to web-page navigation.

A fundamental concept introduced by QE View is that of mask/link tree (ML-tree). It is a view storage format that allows associating any view to any data, preempting inconsistencies (see Sections 6.3 and 6.2). ML-trees provide a common abstraction for expanding/collapsing sub-objects, scrolling large arrays, and conditional displaying of sub-components, such as showing features based on a map's resolution.

QE View's responsiveness relies on handling certain events optimistically, using update managers (Sections 7.2 and 7.3). By maintaining a cache of information on the client, and delaying updates from the server, it is possible for commands to take effect without waiting for a server response, with differences subsequently reconciled. The ROST update manager (Section 7.5) provides an original solution to editing scalars (single values) asynchronously without locking the interface, even with lengthy server delays.

Hardware differentiation can be done by isolating exactly which part of a view's description is hardware-dependent. QE View's notion of detachment data, stored locally, (Sections 6.1 and 8), addresses window position concerns, and provides a navigation method for mobile devices.

4.3 A Brief Overview

Section 5 describes, among other things, features for data QE View works with. The mask and payload concepts are introduced, and the DisplayObject class detailed.

Section 3 follows the steps to render a client display:
(1) Constructing a tree of display items: Section 6.1 describes the view storage format, Section 6.2 the information ML-trees transport, while 6.2.1 details some technical aspects of shared views.

(2) Sending client updates: Section 6.3 describes ML-trees, the key concept behind the client-server communication used.

(3) Updating widgets: Section 6.4 describes the Widget class and the various steps involved in patching widgets.

Events are covered in Section 7. QE View's messaging system is discussed first, followed by optimistic events and update managers. A specific example of optimistic mask update shows the interaction between events and ML-trees.

Section 8 discusses hardware differentiation using detachment data, for both desktop and mobile devices. Shared views are covered in Section 8.2, and the need for the DI-server of Section 6.2.1 explained.

Finally, the development framework is outlined describing the general approach and specific packages provided, with their additional requirements for display objects.

5 Example Features for Data

QE View works with items of data called display objects, each corresponding to a client-side widget; widgets are organized as a tree. Their interaction with QE View is mediated by masks and payloads:

5.1 Masks

Masks

Masks are a way to limit which descendants of a vertex are visible. A mask is a boolean function mask(link), returning True if, given mask is in effect for the parent, a descendant characterized by link is visible. A few examples:

(1) Expansion mask: True/False for an expanded/collapsed object. For an expanded object, all descendants are visible, for a collapsed one, none.

(2) Range mask: Scrolling a window of size s over a vector is represented by masks $m_n(i)=n \leq i < n+s$, for $n \in N$; the link of an entry is its position.

(3) Map mask: (long, lat, width, height, scale), with links (x, y, maxScale); it evaluates to True if (x,y) belongs to the viewed rectangle and scale≤maxScale. It is a 3-dimensional range mask.

Masks and links can be serializable.

5.2 The Payload Class

A payload carries the information useful to build client side widgets. To minimize network traffic, only differences are sent. The approach is similar to using the diff/patch utilities for UNIX files, relying on the guarantee that patch (x, diff (y,x))=y.

The Payload interface consists of:

(1) pl_diff (other): Raising an error causes the corresponding widget to be rebuilt.

(2) pl_patch (diff): Should not raise an exception; if the patch cannot be done, pl_diff fails on the server.

Payload classes is serializable.

5.3 The DisplayObject Class

Display objects are derived from DisplayObject:

(1) id: Unique identifier for each object, used to recover top objects in a view.

(2) stamp: An integer describing when the object was last modified, analogous to database timestamps. If the stamp hasn't changed, it is assumed all methods below would produce the same results. (descendants(mask) will be run only if the mask has changed).

(3) oneValue( ): A scalar and/or icon, to visually reference the object, e.g. when it is detached or in window titles.

(4) Widget( ): The type of the widget to be constructed on the client; see Section 6.4.

(5) payload( ): Data useful to build the object's widget, exclusive of descendants.

(6) descendants(mask): The visible descendants given mask, indexed by link. For each descendant the following information is provided:

a. object: The descendant display object.

b. placing: Describes how to place the child widget in its parent, e.g., grid coordinates and labels.

c. mask: Initial mask of descendant; use None to revert to the descendant's defaultMask.

d. format: Initial format of child widget.

e. detach: Detachment data for child widget; see Section 8.

(7) Top object initialization: When an object is opened (added as a top object of the view), there is no parent to provide the mask, format and detachment data. defaultMask( ), defaultDetach( ) and defaultFormat( ) are used instead.

(8) Static methods:

a. calls( ): Returns a dictionary of callable objects providing access to application logic. The arguments are provided by widgets when the client generates events.

b. getObject(objectId): Recovers the display object with id=objectId.

6. Rendering a Client Image

In broad terms, the steps are as follows:

(1) The display item tree (containing the last-used visualization) and the display object tree (current data to be displayed) are combined into a new tree, with display items created or deleted as needed.

(2) The result T is compared against a synchronized copy S of widget information, kept both on the client and on the server. The difference T–S is sent to the client.

(3) S is patched with T–S, resulting in an S, both on the client and on the server. It is not true that S'=T; S' is a superset of T, with S'–T consisting entirely of invisible vertices. S acts as a cache, by reducing network traffic from the server to the client, and allowing certain events to be anticipated on the client.

(4) Widgets are updated on the client based on the new S.

6.1 The View Storage Format

A view consists of a set of top objects, which appear in a window of their own. Each top object is associated a unique display item, which describes which sub-objects are to be displayed, and how. A display item consists of the following:

(1) id: Unique integer across all display items.

(2) link: Link to be used with the parent's mask.

(3) parent: The parent display item, or None for top objects.

(4) mask: The current mask to be applied to descendants.

(5) format: Formatting information, interpreted by the widget.

(6) detach: Default detachment data, per device class. See Section 8.

Given the parent field, display items represent a tree. When rendering a client image, the display object and display item trees are reconciled, using existing display items as much as possible. Changes in object's descendants dictionaries result in adding or deleting display items.

Display items and their association to top objects are persistent; links, masks, formats and detachment data are serializable.

The application can open objects by the openObject (objectId) function provided by the framework. The effect will be to recover the object using DisplayObject.getObject, create a new display item with link=parent=None and mask, format and detachment data provided by the object's defaultMask, defaultFormat and defaultDetach methods, and insert the new pair in the view's list of top objects.

6.2 Generating a Payload Tree

The payload tree consists of a vertex for each client-side widget (instance of Widget) to be displayed; each vertex also corresponds to a display object. A vertex appearing in the payload tree is visible according to the masks.

To generate it, a queuing algorithm may be used. The queue consists triples (displayObject, displayItem, placing), and is initialized with the top objects of the view, using placing=None. Processing a queue entry (obj, di, plc) is done according to the following steps:

(1) Add a vertex to the payload free: Each payload tree vertex contains an instance of the class VertexState. Following fields and values may be used:
  a. id: Set to di.id.
  b. mask: Set to di.mask.
  c. link: Set to di.link.
  d. oneValue: Set to obj.oneValue( ), or from cache retrieve from cache if obj.stamp is not changed (see below).
  e. payload: Set to obj.payload( ), or from cache.
  f. Widget: Set to obj.Widget ( ), or from cache.
  g. format: Set to di.format.
  h. detach: Set to di.detach.
  i. placing: Set to plc.
  j. message. Get messages addressed to di.id from the mailbox. See Section 7.1.
(2) Generate descendants: The following steps may be followed:
  a. The descendants dictionary descObject is obtained by calling obj.descendants (di.mask), or retrieved from cache.
  b. A dictionary descDI of display items with parent=di.id is constructed based on the permanent storage.
  c. For every link in descObject such that di.mask (link)=True, do:
    i. If link appears in descDI, let childDI:=descDI[link].
    ii. Otherwise, let childDI be a new display item with link:=link, parent:=di.id, mask:=descObject[link].mask (replace with obj.defaultMask( ) if None), format:=deskObject[link].format, detach: =deskObject[link].detach. Add childDI to permanent storage (see Section 3.2.1).
    iii. Add (descObject[link].object, childDI, descObject[link].placing) to the queue.
  d. For every link in descDI which is not in descObject, such that di.mask (link)=True, mark the display item as obsolete (see Section 6.2.1).
(3) Remove triple from queue.

The payload tree is complete when the queue is empty.

To speed up calculations, a cache stores a reference to the object, the mask last used, the stamp of the object, and the results of calling payload, descendants etc. If the stamp and the mask have not changed, cached results are used.

6.2.1 The Display Item Server

Ideally, generating a view were a read-only operation, especially to deliver multi-user views. That is however not the case, as display items are added to permanent storage when they are first used, and deleted when they are no longer needed.

This can be solved by routing these operations through a display item server (DIS). Whenever a display item is needed, an in-memory representation is created to be used for that one tree construction, and an event is sent to the DIS. The DIS will create (or restore an obsolete one) or mark obsolete a display item only once. Importantly, it is not necessary to change a display item during payload tree generation.

Some cases require care. Suppose an object has $d_0, d_1, d_2$ as descendant dictionaries for stamps 0, 1, 2 (in the sense of the DisplayObject field stamp, Section 5.3), and there is a link l such that $l \in d_0, d_2$, $l \notin d_1$. Two refreshes $R_1, R_2$ are started, based on stamps 1 and 2, but $R_1$ finishes after $R_2$. $R_1$ finds l obsolete and requests the DIS to mark it so. The DIS knows the request should be ignored.

This may be accomplished by including the stamp the of the object in the request to the DIS. The DIS can compare the received stamp with the current stamp of the object, and ignore the request if the two are different. In this case $1 \neq 2$.

Only requests to mark as obsolete may be refused. Creating or restoring should be done all the time, as it has minimal costs. In the case of fast-changing objects, this avoids the potential problem of rejecting too many create requests.

6.3 Diff/Patch for Mask/Link Trees

Sending a full payload tree to the client every time any change has occurred is impractical for large displays. Updates may be limited to visible changes that have occurred since the last client refresh, using the mask/link mechanism.

6.3.1 ML-Trees

It is clearer to first describe the approach in an abstract setting. Let $0 \in I \subseteq N$ be a set of positive integers, thought of the set of all display item IDs used by the application. Let L an arbitrary set of links, and l: I→L the link of each display item (links are immutable). A mask will is any subset $M \subseteq L$, i.e. $M \in P(L)$, where $P(X)$ denotes the set of subsets of a given set X.

The set of possible items may be denoted by V (in practice V=VertexState). If V has diff/patch operations of its own, it may be possible to reduce network traffic by computing differences of elements of V. The term v'-v may represent the result of V-diff.

An ML-tree will be a set $0 \in T \subseteq I$, together with functions p:T→T, M:T→P(L) and v:T→V. p(x) is the parent of the vertex x; the root is always 0, and p(0)=0. v(x) is the useful value of the vertex, and M(x) its mask.

A tree T' will be a subtree of T, and this may be written as T'≤T, if $T' \subseteq T$ and p=p', M=M', v=v' on T'. For a set $0 \in X \subseteq I$ and functions p: X→I, and m, v as above (which is not a tree asp(x)∈X is not guaranteed), the set of vertices reachable from 0 forms a tree T[X]. Thus, $T[X] = \{x \in X | p^n(x) \in X, \forall n \in N\}$.

For any ML-tree T its visible part T* may be defined to be equal to $T[\{x \in T | l(x) \in M(p(x))\}]$; it consists of vertices for which none its parents are masked. In this case, T* is an ML-tree and T*≤T.

While only vertices in T* are displayed on the client, it is useful to keep track of more than visible vertices. Consider scrolling a large array of size N. Let I={0, 1, . . . , N} and l(i)=i, p(i)=0 for i=1, . . . , N. Define ML-trees T, T' using M={1, . . . , 100}, M'={51, . . . , 150} as masks at 0∈I. The transition T to T' corresponds to scrolling down 50 entries. After the scroll, the client has to wait for entries 101 through 150 to be received from the server. However, it is useful to be able to scroll back and display the old values for entries 1 through 50 right away, and receive updates only for changed values.

Consider construction of operations, $\ominus$, $\oplus$ (diff and patch), such that for $T_0, T_1$ ML-trees with $T^*_1 = T_1$ give:

$$T_1 = (T_0 \oplus (T_1 \ominus T_0))^* \tag{1}$$

A sequence of ML-trees $T_n = T^*_n$ can then be displayed by iteratively constructing $S_0 = T_0$ and $S_n = S_{n-1} \oplus (T_n \ominus S_{n-1})$, which satisfy $S^*_n = T_n$. Synchronized copies of $S_n$ are kept both on the server and the client. The construction also makes sure updates changes are only sent to visible vertices.

The approach can be thought of as a cache strategy. The server cache reduces network traffic, while the client cache allows some events to be handled optimistically. The identity $S^*_n = T_n$ allows the client to rely on the mask to determine what vertices should be displayed.

The $\ominus$, $\oplus$ operations below are one possible cache strategy. The $S_n$'s can be limited in size by retaining vertices most recently visible. The client cache can be different, as long as it includes all vertices in the server cache; if the server assumes the client already has a vertex, it possibly still exists on the client. As memory and CPU constraints are likely more stringent on the server, a larger client cache can be beneficial.

To define $\ominus$, $\oplus$ let $T_0$, $T_1$ be ML-trees with $T^*_1 = T_1$. Define $\Delta_+ = T_1 - T_0$, $\Delta_{\neq}$ to consist of $x \in T_0 \cap T_1$ for which at least one of $p_0(x) \neq p_1(x)$, $v_0(x) \neq v_1(x)$, or $M_0(x) \neq M_1(x)$ is true, and $\Delta_- = \{x \in T_0 - T_1 | p_1(x) \in T_1, l(x) \in M(p_1(x))\}$. $\Delta_+$ consists of new vertices, and $\Delta_{\neq}$ of changed vertices. The vertices of $\Delta_-$ do not appear in the new tree, yet their parent does, and the link is visible according to the new mask, and will be deleted.

Define $T_1 \ominus T_0 = ((p|_{\Delta_+}, v|_{\Delta_+}, M|_{\Delta_+}), (p|_{\Delta_{\neq}}, v_1 - v_0, M|_{\Delta_{\neq}}), \Delta_-)$. For patching, let $X_1 = (T_0 - \Delta_-) \cup \Delta_+ \cup \Delta_{\neq}$ by patching $p_0$, $v_0$, $m_0$ with the functions in $T_1 \ominus T_0$, giving preference to the latter whenever there is an overlap. Define $T_0 \oplus (T_1 \ominus T_0) = T[X_1]$.

It may be seen that $T[X_1]$ is an ML-tree, $T_1 \leq T[X_1]$ and $T_1 = T^*_1 \leq T[X_1]^*$. To see that $T[X_1]^* = T_1$, notice that if that weren't the case, any element of $T[X_1]^* - T_1$ of minimal distance from 0 would be in $\Delta_-$, contradicting the definition of $X_1$.

6.3.2 Using ML-Tree diff/patch for Client/Server Interaction

The above operations translate into the following algorithm for updating a client display:

(1) Generate a payload tree, as in Section 6.2. The result Tn is an ML-tree with V=Vertex State.
(2) Compute δn=Tn Sn−1. This is done by parsing Tn, and checking the conditions for Δ+, Δ/= and Δ−. Relying on the Payload interface, VertexState implements methods diff and patch, thus vn−vn−1 can be used.
(3) Send δn to the client.
(4) Compute Sn=Sn−1 δn on both the server and the client. This includes deleting vertices no longer reachable from 0.
(5) (optional on the server) Check that Tn=S. This should always be true if, have been implemented correctly, but it does not hurt to verify during testing.

Notice the client response is not delayed by steps 4 and 5 on the server.

6.3.3 Features of an Underlying Transport Layer

QE View uses objects sent between the server and the client. The patch mechanism above relies on a sequence of the updates, therefore data sent by the server arrives in order. This is not required for client-generated events.

In some embodiments, the above can be implemented by establishing an ssh encrypted tunnel over TCP/IP, and using Python's pickle as a serialization tool.

For a web-based solution, AJAX/Comet provide the tools to establish asynchronous communication. Long events can be used to accomplish the ordered queue going from the server to the client. POST http requests can be used for sending events from the client to the server.

6.4 Updating the Client Display

The first step is patching the client ML-tree, as per above. Vertices that appear in the diff tree are marked as "touched".

Once the ML-tree is correct, widgets are updated or build as needed. The process relies on the Widget class, exposing the following:

(1) Constructor: Takes two arguments:
 a. parent: The parent vertex in the tree.
 b. vertexState: The vertex information in the ML-tree, which includes the Payload instance associated with the vertex. See Section 6.2.

The constructor of a widget is run before those of its children. For operations that is to be done after the children have been constructed, w_afterChildren can be used.

(2) w_patch(diff): Corrects the widget based on the result of pl_diff. It can raise an exception, causing the widget to be rebuilt. The um_update methods of update managers used by the widget are be called here.
(3) Geometric placement methods:
 a. w_place(placing): Place a widget.
 b. w_remove: Remove a widget, forgetting its position; reverts w_place.
 c. w_withdraw: Make a widget invisible, but remember its placement.
 d. w_restore: Restore a withdrawn widget.
(4) Optional methods (provided but can be overridden):
 a. w_afterChildern: A function to perform tasks that use information from children. This is run whenever the vertex or its children change, or the widget is constructed.
 b. w_showAlert: A function to update event alerts.
 c. w_setMask: Withdraws/restores child widgets according to the mask. It relies on w_withdraw and w_restore, and is exposed so that additional actions can be taken.
 d. w_updateMask: Processes a change of mask in the client ML-tree. As optimistic mask events are used, it calls the mask update manager's um_update method. The call to w_setMask may be delayed. See Sections 7.2 and 7.3.
 e. w_setPlacing(placing): Places the widget according to placing. It relies on w_place and w_remove, and is exposed so that additional actions can be taken.
 f. w_updatePlacing: Processes a changed placement by calling the widget's placing update manager, as widgets allow placing to be changed optimistically.
 g. w_destroy: Destructor.

For each vertex that was touched in the patch process, or whose widget is to be built, the following steps are followed (recursively):

1. Patch the widget, unless:
 (a) It is a new vertex.
 (b) A parent widget was destroyed, causing the vertex' widget to be destroyed.
 (c) pl_diff failed on the server.
 (d) The widget type has changed.
 (e) w_patch fails. An existing widget that cannot be patched is destroyed along with its children.
2. If desired, build the widget.
3. Update the mask by calling the widget's w_updateMask.
4. Update the placement by calling the widget's w_updatePlacing.
5. Delete vertices that have disappeared from the tree.
6. Build widgets for new children.
7. Update child vertices that were touched by ML-tree patch.
8. Call event messages. Doing this step after w_patch and child updates insures um_update calls have already run, as required by update managers (see Sections 7.1 and 7.3).
9. Run w_afterChildren.
10. Run w_showAlert.

The update is complete once every new or touched vertex has been processed.

7. Event Handling

7.1 Sending and Tracking Events

While the server distinguishes between events that affect display items only, such as mask and format changes, from running callable objects provided by the application, on the client the mechanism is the same.

The Widget class provides the putEvent(event,handler) method for sending events. A unique ID is returned, and the event is registered with the vertex. The server provides an outcome message, and when received the client calls the handler with the message as argument. Which vertex an event is registered to affects when it is delivered, as only visible vertices receive messages; this insures visual alerts are seen as they occur, e.g flashing value updates. To avoid delays, an event can be registered to the root or a parent (but not child, see Step 8 in Section 6.4).

Messages resulting from processing events are conveyed to the payload tree generation thread via a message box server, which stores messages by display item id and event id.

7.2 Optimistic Events

A display can be made more responsive by performing some changes before events are sent. While in general it is not possible to know what the effect of an event will be, in many cases there is a likely outcome that is worth displaying.

This makes sense for events altering the view, for example collapsing an object. Even in the unlikely case the event fails, the effect is easily reverted. When re-expanding a collapsed object, if child vertices are cached, the old information can be initially displayed. It should be possible for sequences of expand/collapse to proceed with no server delay.

QE View accomplishes this by distinguishing information received from the server, called reference data, from screen data that is actually displayed. The two are reconciled using event messages. A number of schemes are possible; the corresponding QE View concept is the update manager.

7.3 Update Managers

Update managers encapsulate the logic of what to display and how to handle server updates. The SetAndSuspend manager used for mask events (expand/collapse, scrolls) blocks updates when a vertex has pending events (Section 7.4). The more complex case of inputting values uses the ROST manager (Section 7.5). Finally, non-optimistic events can use JustAlert to perform no visual changes but keep track of pending events.

Update managers share a simple interface:
1. A constructor that takes the following arguments:
(a) scrGet. A function to read the current display value.
(b) scrSet. A function to set the current screen value.
(c) val. The initial value.
2. um_update(val) Changes the reference value. Should be called from w_patch. The messaging system guarantees it is called before handlers, as long as events are registered with the vertex or one of its parents.
3. um_pending( ) Returns True whenever an alert should be displayed, typically when pending events are present.

Update managers are quite self-contained. Aside from expecting handlers to always run after um_update, the only feature is that any method that involves communication with the server, e.g. saving a value, is passed a function putEvent (event,handler) that returns a unique event ID.

From an allocation standpoint, update managers should be members of the ML-tree vertex rather than the widget, as to not be lost should the widget be destroyed (see Section patch-client).

7.4 The SetAndSuspend Update Manger

Used by mask and format events, this manager is suitable for values that can be changed instantaneously (e.g., expand/collapse), but not inputting values. It is essentially a counter of events, and changing the reference value is ignored as long as the count is positive. The screen value can be changed at any time by calling set(value,putEvent), whether events are in progress or not.

To clarify how update managers interact with ML-trees, here are the steps of an optimistic expansion of an object:
(1) A bound action (e.g. a mouse click) calls SetAndSuspend.set(True,widget.putEvent). This results in an immediate visual update, showing the children of the previously collapsed vertex. The screen mask is changed, but the reference mask is not.
(2) Visual mask updates are suspended until the event returns. If another user toggles the object, the effect is not shown, and similarly for a quick sequence of expand/collapse by the same user. The latter eliminates the object seeming to toggle "by itself".
(3) The event is processed on the server, and the mask is updated.
(4) The new mask is picked up by ML-tree diff, sent to the client, and the client tree is patched. um_update is called, but as the event's handler has not been called yet, the counter is still positive, and there is no visual effect. The order of calling w_patch and handlers is important here (Step 8 in Section 3.4 and Section 4.1).
(5) The event handler is called. Assuming only one mask event, this will end update suspension, and the screen will show the reference value. If the event succeeded, the screen is already correct and no update is performed.

7.5 The ROST Update Manager

The ROST update manager (an acronym of the reference/optimistic/screen/typed values used) is designed for editing a single scalar value. An important application of is the formEditor package (Section 9.2).

Inputting values raises problems not presented by mask events. Updates while typing is in progress, attempts to edit while saving, and error values are be handled. ROST has the following properties:
1. Editing can always be started instantaneously.
2. Unfinished edits are never accidentally lost.
3. The display can always display the most up-to-date server value, as well as recent optimistic values.
4. Values resulting an error are displayed in a visually distinct way, and can be re-edited.

One property of the messaging system may be that a message is generated after the event has been run. It is not assumed that processing events finishes in the order they were sent; the server can handle long events asynchronously.

ROST is a generalization of SetAndSuspends, whose set method can be replicated by an "edit+typing+save" sequence.

7.5.1 Display State Representation

The display state consists of the following:
R Reference Value: The last scalar value received from the server. At any time, there is exactly only one reference value.
H History: A stack of triples, each consisting of:
1. value: Either a reference value, or a value for which an attempt to save has been made (successful or not). Typed but unsaved values do not appear in the stack.

2. id: For optimistic values, the id of the save event sent; None otherwise.
3. message: The message received from the server. <OK> signifies success. A stack entry with a non-None id, and None message is a pending save, i.e. a response has not been received from the server yet. If a save fails, the history retains the error message.

The stack obeys the constraint:
(SC) If the top entry is not pending, H[TOP].value=R, and H[top].message is either None or <OK>.
The message restriction insures that when a save event fails, but the saved value is equal to R (can happen if a value was resent, but the server rejects redundant updates), the client is not stuck with an error message.

T Typed value: A value that was typed in and not saved, but is currently not on the screen.
C Cursor: A token describing what the screen shows:
  REF The reference information.
  TYPING The the display shows an unsaved value. T=None in this case.
    TOP The top of the history stack, which is either the last save sent (pending or not), or the reference value.
    int An integer pointing to a stack entry that is not top.
S The screen value. Whenever the cursor changes, S is updated accordingly.

7.5.2 Events

The user interaction is provided by events. Following is their description and effect on the display state:
(E) Edit. Accepted whenever C≠TYPING. The state changes to C=TYPING, T=None, with R, H, S unchanged.
  (D) Discard typing. Allowed only when the C=TYPING. The effect is C:=TOP, S:=H [TOP].value.
  (S) Save. Receives putEvent. Allowed only when C=TYPING. The value to save is S, and the following steps are followed:
    1. An instance event=ROST.SaveEvent(S) is created.
    2. An eventId is obtained by calling putEvent(event, handler). Calling handler triggers the (M) event below.
    3. The triple (id=eventId, value=S, message=None) is added to H.
    4. C:=TOP.
  (U) Update. Receives val. Can occur for any cursor. The reference value is updated R:=val. (SC) may no longer hold. If that is the case, a triple (value=R, id=None, message=None) is added at the top of H, and an int cursor is replaced with TOP.
  (M) Message return. The handler receives eventId and message. Can occur for any cursor. The (M) event has an effect on both H and C:
The stack is changed in 3 steps:
1. The unique integer i such that H[i].id=eventId is found.
2. H[i].message:=message.
3. If i points to the top of the stack, i.e., H[i]=H[TOP], (SC) may no longer hold. If that is the case a triple (value=R, id=None, message=None) is added at the top of H.
The cursor is updated according to the following rules:
1. If C=TOP, H[i]=H[TOP] and message≠<OK>, C:=i. This has the effect of showing the error value (perhaps in a different format); i is no longer the top of H.
2. If a new entry has been added to the stack to satisfy (SC), and C is int, then C:=TOP. This discards looking at old values in favor of showing an updated reference value.
(R) Switch to reference. Accepted when C≠REF. The effect is C:=REF.
(B) Go backwards. Always accepted. The new cursor depends on the initial cursor as follows:
  TY TOP.
  PING:
    RE TOP.
  F:
    TO Index of the stack item right bellow top.
  P:
    n: n−1, or no change if at the bottom of H.
(F) Go forward. Acceptable when the cursor is not TYPING. The new cursor depends on the initial cursor as follows:
  RE TYPING if T None.
  F:
    TO TYPING if T None
  P:
    n: n+1 or TOP.
(C) Clear history. If T=None, C:=TYPING and C:=TOP otherwise.

If desirable for memory limitations, the stack can be trimmed at the bottom, limiting the history, with appropriate changes in event implementations.

7.5.3 Visual Alerts

The display can be made more user friendly using visual alerts. The following system works well:
1. When the concerned value is on screen, show a hard flash (strong colors):
   (a) A hard/normal flash, to show a value being updated, e.g. R changes and there are no events pending; the new value is visible immediately.
   (b) A hard/error flash, to show an error has occurred when C=TOP and H[TOP] is pending; the error-causing value remains visible.
2. When C=TYPING, and an event concerns a value not currently on screen, show a soft flash (pale colors) without leaving edit mode:
   (c) A soft/normal flash, to alert the user the H[TOP].value value has changed.
   (d) A soft/error flash, to alert the user the pending save at H[TOP] failed.

8. Hardware Differentiation

QE View is intended as a portable framework. The ability to support different hardware has become increasingly important, driven by the desire to access information from work, home and mobile devices. A lot of industry effort is devoted into this issue, and resulting technologies like HTML5 and Javascript can be used by QE widgets.

Handling different monitor sizes (or multiple monitors), however, is not solved by the above technologies. This issue is particularly relevant for hierarchical data: expanding an object "in-place" is useful on a large monitor, but awkward on a smaller device as it requires too much scrolling. Web design runs into this problem as well, and web-sites dedicated to mobile are common.

QE View addresses differences in display size by separating detachment data from view storage. Every display item can be toggled between two modes:
1. Embedded: The parent display item is enlarged to accommodate it.
2. Detached: Shown as a separate window.

Detachment data consists of the mode and the window coordinates, and is stored on the client machine. QE View has a concept of installation, each tied to one device only, and containing a device class characterization. Detachment data is stored keyed by display item and installation, thus different installations on the same machine do not interact.

Each display item is constructed with default detachment data, one per device class. An expansion can be in-place for a desktop or tablet, but detached on a phone. When a view is first opened by an installation, the default detachment data is downloaded; subsequent changes are stored locally.

Local detachment data can be uploaded to the server to replace the device class defaults, or conversely, the defaults reloaded. A local setup can be replicated on a device in the same class by combining the two, without affecting other device classes.

8.1 Small Devices

The meaning of detachment coordinates is for each device class to decide; any string, and by extension any serializable object can be used. For a small enough device, window coordinates make no sense, as each window takes up the whole screen. While a phone will never have the same capability as a large monitor to show complex information, detachment data can provide a way to organize and access objects via a navigation map and shortcuts.

The navigation map consists of an icon for each object, viewed similarly to apps on a smart phone. The grid position of the object's icon is stored as detached data, along with shortcuts and priority in the object stack (determines which object is on top). Detachment data translates into an icon configuration and shortcuts; customizing and sharing configurations works similarly to window positions for the desktop class.

Bear in mind a view's masks and formats are shared among installations. The navigation map visually differentiates collapsed and expanded objects, and touching a collapsed object expands it. A synchronized desktop will see the toggle as well.

Finally, the notion of activation provided by the selection package (Section 9.2), which on a desktop has the effect of changing the color of the object's top bar, is interpreted on a small device as raising the object to the top of the stack; users can show objects to one another.

8.2 Shared Views

Shared views rely on a number of design features presented so far. Display items are stored in a database, allowing concurrent updates. The DIS (Section 3.2.1) reconciles create/delete display item requests from multiple sources, while changes are distributed automatically via ML-trees. Finally, storing detachment data locally allows masks and formats to be shared among users, while adapting the views to specific hardware.

Additional features can be added. Especially for a large number of users, it is desirable to restrict user's ability to change a view. Three modes are provided:
1. Free: Any user can act at any time.
2. Grab: Only one user has focus, but anyone can grab it at any time.
3. Conference: Only one user has focus, an he can cede it at someone else's request.

The user interface provides a share bar, showing information about users currently on. It consists of:
1. A left button, used to request control. Shows own status. Grey=Idle, White=Focus, Flashing White=Requesting.
2. Middle buttons, for other user's status. When another user requests, the button splits in two. Top part flashes white, bottom is solid red. Clicking the top grants control, bottom denies.
3. Right button. Deny all.

Every view has an owner who can set the mode, and grab control for himself

9. Development Framework

The framework is currently for Python. Using a Django/jQuery/JavaScript stack to deploy as web technology, the client side can be ported to JavaScript/HTML5, to run within the browser environment.

9.1 Example Principles when Developing with QE View

Data is separated into categories, reflecting how QE View handles it:
1. Core data: Application data that makes sense absent displays. Core data complies with the DisplayObject interface, requiring Payload and Widget classes.
2. Display data: This is the part of the visual information shared among users, and is represented in terms of masks and formats.
3. Local adjustments: Can be either volatile or permanent, e.g., using cookies or HTML5's localStorage.

Secondly, optimistic events should be identified, and an update manager decided upon. As with any concurrent problem, users can attempt conflicting things. A few principles help:
1. Make the information granular. This reduces the number of collisions among events.
2. Have events be incremental. If a format consists of ordering a number of items, events should be transpositions rather than the new permutation; this prevents stale data from being reinstated.
3. Events should commute whenever possible. For example, expand/collapse is implemented as a toggle rather than setting the mask to value, as toggles commute, while sequences of set do not.

While for many applications the classes provided eliminate the desire to write client-side scripts, QE View is designed as a general purpose tool. In many cases it will be useful to customize existing classes, or implement the interfaces from scratch.

New masks/links can be created, subject to being serializable. The JustAlert, SetAndSuspend and ROST managers cover a large number of situations, but new update managers can be implemented based on the messaging system; the principles described in Section 7.3 should be followed.

9.2 Packages

The framework provides a number of packages that simplify common tasks. As expected, they impose requirements in addition to those of DisplayObject.
1. selection: Implements a copy/paste mechanism, and a concept of active widget. Objects implement:
   (a) pl_Type: A field within the payload class. Used by the client to perform some type checking as part of the copy/paste functionality. For example, an integer should not be confused with an object id.
   (b) set (link,value): For the paste event.
   (c) choicePath( ) Returns a list of links. This allows visually highlighting a sub-display item, e.g. a choice in a drop-down list. Using a list of links as the return, rather than just one link, allows handling cases where the selection is not directly visible. An example is making a selection within a tree, where the item selected can belong to an unexpanded vertex; in that case the object that is to be expanded to find the selected item is highlighted instead.
2. execution: Executing methods for visual objects. Relies on selection. Objects implement a methods (mask) method, returning a dictionary of methods with bindings as keys, in a format understood by the corresponding widget. Entries should expect the following arguments:

(d) mask: The object's mask in the context where the method is called. There is no way for the object to recover this information independently.

(e) path: The succession of links to reach the selection from the object whose method is being executed, if within the object. One use is container operations.

(f) selection: Selection on the client. Allows e.g., inserting a value into a list.

(g) pl_Type: The type of the selection.

The return can be either None or an object id. The view will open the id as a top object, if it is not a top object already, and bring its window to the foreground.

3. formEditor: Implements optimistic form editing using the SetAndSuspend and ROST update managers. Relies on selection.

A form can be composed of scalars or sub-objects. The Form class provides functionality to request editing rights from the server; such requests are handled optimistically by a SetAndSuspend manager. Each individual scalar has its own ROST manager. The interaction is linked: attempting to edit a scalar causes a request to put the form in edit mode, and a save command causes all sibling scalars to be saved as well.

The combination of SetAndSuspend and ROST for scalars provide a robust solution to a problem that otherwise requires complex state diagrams. A fairly large number of cases are covered, e.g., when a scalar edit resulted in an error, but the user loses the right to edit the object. The formEditor provides editing without delays in all situations, difficult to achieve with state diagrams. Indeed, the ideas of ROST were arrived at after repeated attempts at the problem using state diagrams.

Implementation-wise, the package contains the class ScalarWidget, which wraps a ROST manager, providing hooks the form can use to take actions when e.g., a scalar is edited, allowing the above linkage between forms and scalars.

4. array: 1 and 2-dimensional arrays with optimistic scrolling, using range masks.

Figure 29:
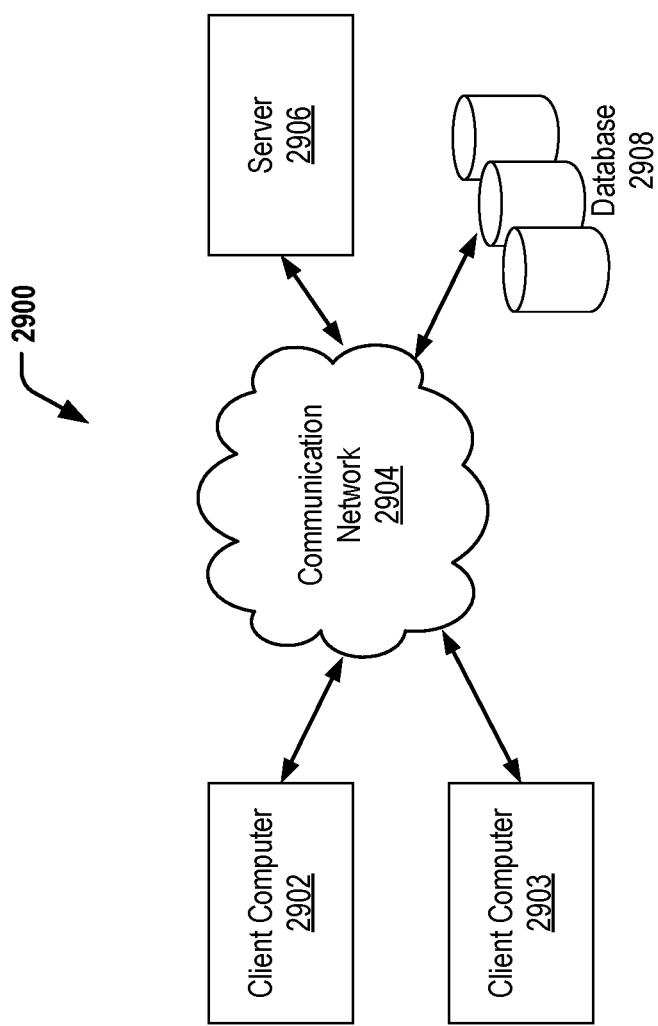
FIG. 29 shows a system for data organization and presentation.

FIG. 29 depicts an example system 2900 comprising client computers 2902, 2903 communicatively coupled over a communication network 2904 with a server 2906 and a database 2908. The various techniques described in this document can be implemented at the client computer 2902, the server 2906 or partly between the client computer 2902 and the server 2906.

The communication network 2904 can be a suitable network, such as a wired or wireless network, e.g., the Internet, Ethernet, wireless cellular network such as 3G, Long Term Evolution (LTE) network, WiMax, etc. In various embodiments, the client computer 2902 may be a computer, a smartphone, a tablet device, using a suitable operating system.

The server 2906 may include a processor, instruction memory and a suitable operating system. The database 2908 may be implemented using storage such as hard drive, flash memory, etc. In various embodiments, the server 2906 and the database 2908 may be implemented on the same hardware platform (e.g., sharing the same power source) or may comprises two different platforms connected over a local connection such as an SCSI interface.

Many systems provide database viewing access to users using client devices via a server, while the underlying data itself may also be changing. The changes may be caused by other applications running on the server or by some users of the system. One challenge is to provide the most current or accurate data to a user, while the data may be changed. Several techniques are possible. For example, in some implementations, e.g., when a user is using a web browser to view data, the user may be able to refresh the web page loaded in the web browser (either manually or automatically) to receive and view the latest data from a server. This solution may be tedious to users and may be unacceptable because of the constant user interaction required. In some implementations, the server may "push" live data, e.g., stock quotes, to the client device. However, scaling such a solutions to millions of users may be run into operational issues such as computational power and bandwidth. Furthermore, streaming view of data may not allow a user to modify the data and propagate the modifications to other users.

As a non-limiting example, consider the case of viewing airlines seating chart while making flight reservations. Some airlines web sites allow users to click on a menu item that opens up an airlines seating chart showing available/taken seats. Often, multiple users may be looking at the same seating information from the airlines' server database and some users may be attempting to make bookings of their seats. In some implementations, a server that provides a view of the airlines seating chart to the client may need to provide a way for the client to be able to view any updates to the data in real time (e.g., within 1 to 10 seconds). It may further be advantageous for the server to provide the data in a format such that only data that is in current active view of the user is refreshed with current values at the server. The ROST data format and the display tree structure based conveyance of viewable data provides a format that meets these objectives, and others. While the above-discussed airlines seating chart example is one example of an application that may benefit from the disclosed viewable data format, the applications of this format are easily scalable and useful in many other situations, including but not limited to, web browsing on an e-commerce web site, accessing financial data, etc.

While viewing data, certain data may not remain in a user's active view. For example, the user may scroll past the data so that the data is outside the active display area that is being viewed by the user. Another example may be that the user may collapse the viewable data by clicking on a "hide" control widget (e.g., a "+" mark in a listing). The server may track a current state of the viewing session and may either refresh slowly or not refresh at all the data values that are not currently in the user's active view, compared to when the values are in the user's active view. This hide/refresh technique may be applied to all data values that can be collectively navigated in or out of the user's active view and may therefore be treated similarly (e.g., all data objects belonging to a vertex of a display tree).

Figure 30:
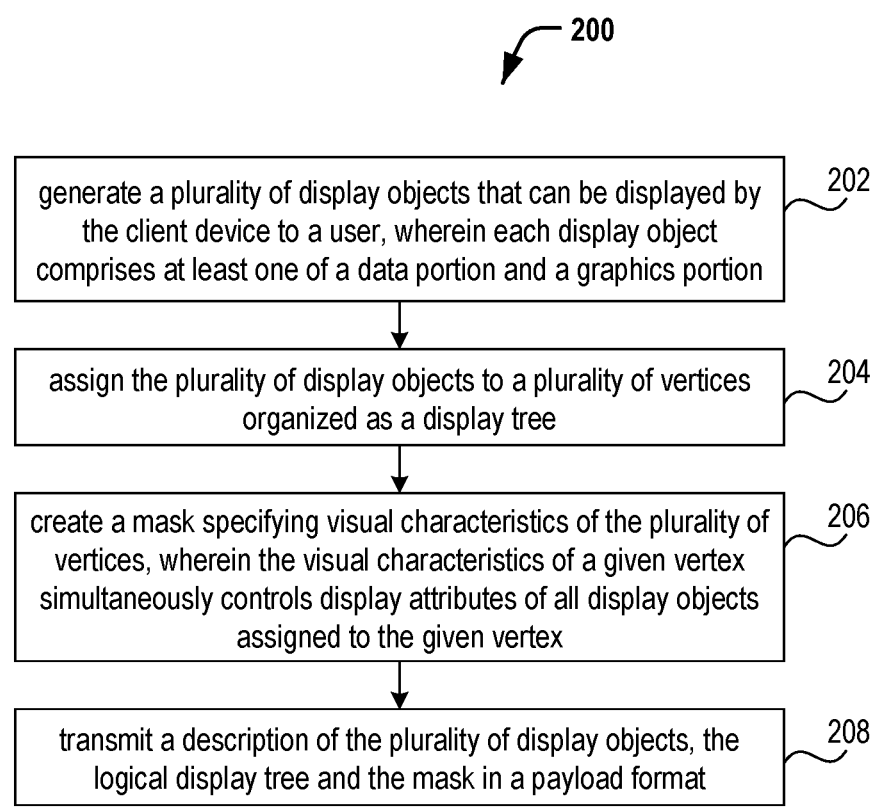
FIG. 30 is a flow chart representation of a method of providing visualization data to a client device.

FIG. 30 is a flowchart representation of a process 200 of providing visualization data to a client device. The process 200 may be implemented, e.g., on the server 2906.

At 202, a server is controlled to generate a plurality of display objects for selectively displaying at the client device to a user, wherein each display object comprises at least one of a data portion and a graphics portion. For example, in some embodiments, the display object may include alphanumerals such as stock values, or data entries. In some embodiments, the display objects include icons, images, an airlines seating chart, and such.

At 204, using the server, the plurality of display objects are assigned to a plurality of vertices organized as a logical display tree. As explained before, and in, e.g., sections 6 and 7, the logical display tree, organized as a plurality of vertices, provides an advantageous way of selectively refreshing or changing a subset of all display objects.

At 206, the server is controlled to create a mask specifying visual characteristics of the plurality of vertices, wherein the visual characteristics of a given vertex simultaneously controls display attributes of all display objects assigned to the given vertex. The visual characteristics may specify whether or not each of the plurality of vertices are visually occluded. In some implementation, the visual characteristics may specify a transparency level, a font type, a size of display of the vertices. In some implementations, the visual characteristics of a vertex are automatically imposed upon the data objects that are assigned to the vertex. For example, when a vertex is hidden from a user's view, all data objects assigned to the vertex are also hidden from the user's view.

At 208, the server is further controlled to transmit a description of the plurality of display objects, the logical display tree and the mask in a payload format. For example, in some implementations, the reference/optimistic/screen/typed value (ROST) format disclosed in the present document is utilized. In some implementations, the description is transmitted as a difference from the previously transmitted description. In one advantageous aspect, this transmission of differences ("cliffs") can reduce the amount of data transmitted from the server 2904 to the client device 2902.

Figure 31:
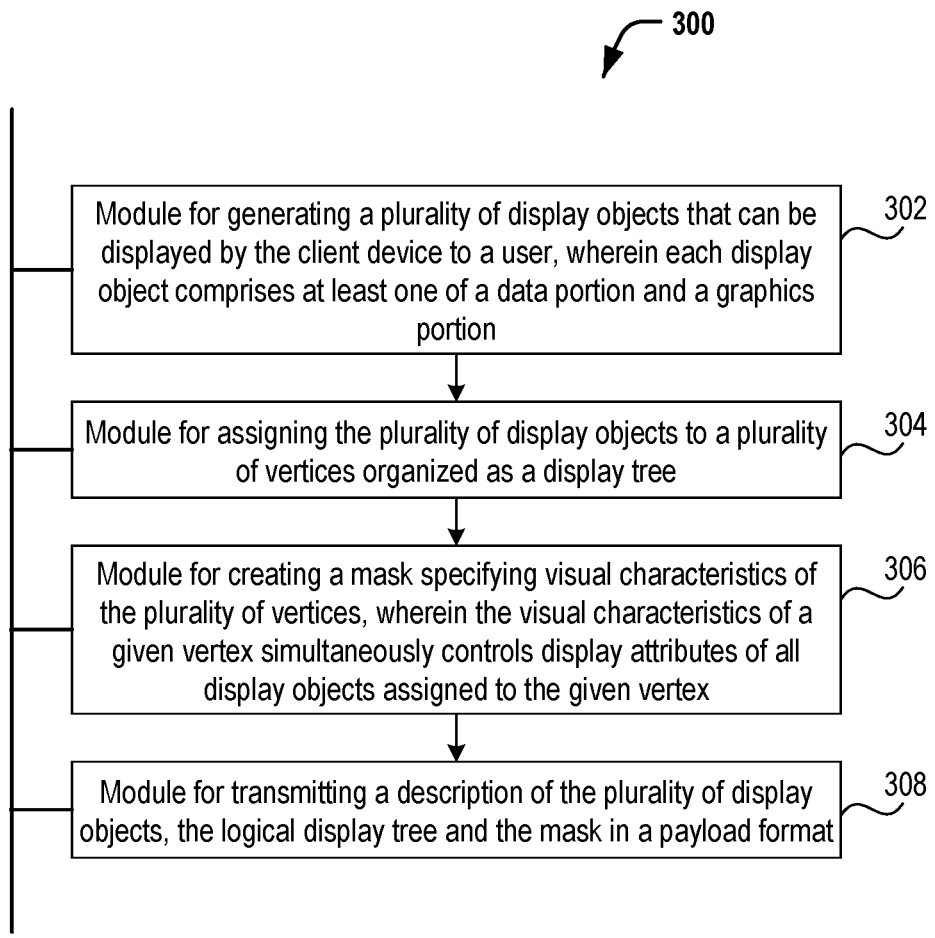
FIG. 31 is a block diagram of an apparatus for providing visualization data to a client device.

FIG. 31 is a block diagram representation of an apparatus 300 for providing visualization data to a client device. The module 302 (e.g., a generator module) generates a plurality of display objects for selectively displaying at the client device to a user, wherein each display object comprises at least one of a data portion and a graphics portion. The module 304 (e.g., an assignment module) assigns the plurality of display objects to a plurality of vertices organized as a logical display tree. The module 306 (e.g., a mask creation module) creates a mask specifying visual characteristics of the plurality of vertices, wherein the visual characteristics of a given vertex simultaneously controls display attributes of all display objects assigned to the given vertex. The module 308 (e.g., a data transmission module) transmits a description of the plurality of display objects, the logical display tree and the mask in a payload format.

As previously discussed, the ROST format provides a novel way for a server to provide views and updated of views to data objects stored on the server to a client device. From a client device's perspective, the ROST format provides the advantages, among others, that the received data is in a compact format so that relatively lighter processing of data is performed at the client device. Furthermore, in some implementations, changes to data objects since the last refresh are organized as vertices that provide a collective state of multiple data objects, thereby simplifying rendering task. A mask may, e.g., provide information about which vertices of a display tree are to be exposed to a user's view and which are not.

Figure 32:
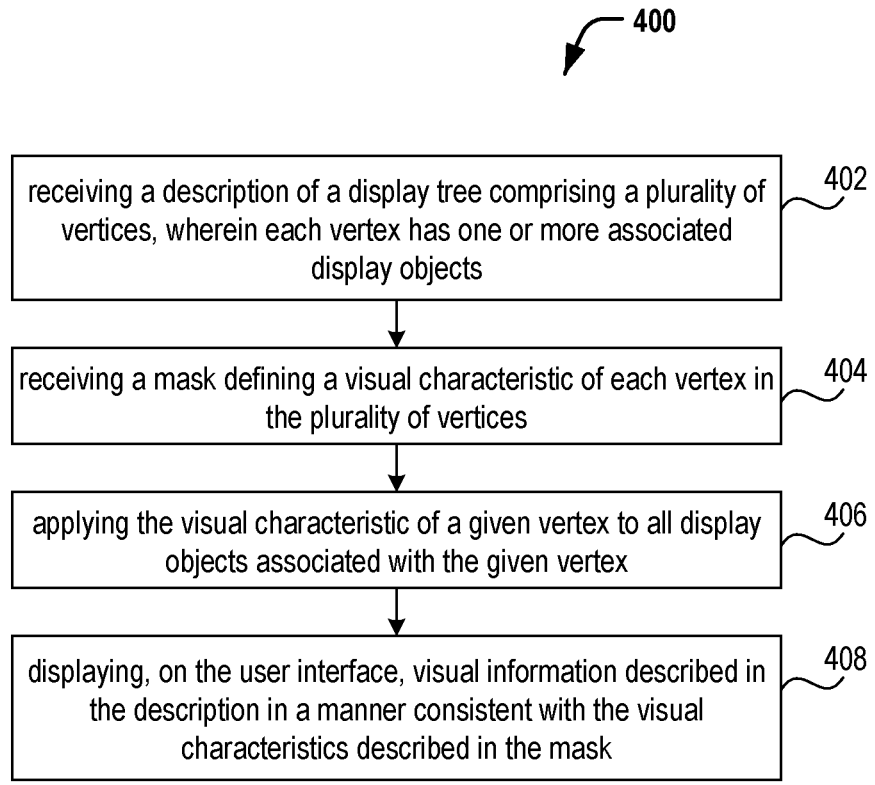
FIG. 32 is a flow chart representation of a method of displaying data on a user interface.

FIG. 32 is a flowchart representation of a method 400 of displaying data on a user interface. The method 400 may be implemented on a client device 2902.

At 402, the method 400 receives a description of a display tree comprising a plurality of vertices, wherein each vertex has one or more associated display objects. The description may be received using the ROST format. The description may be received at the client via a message received over the network 2904.

At 404, a mask defining a visual characteristic of each vertex in the plurality of vertices is received. Various implementations of masks are disclosed in Sections 6, 7, 8 and 9.

At 406, the visual characteristic of a given vertex are applied to all display objects associated with the given vertex.

At 408, visual information described in the description is displayed on a user interface in a manner consistent with the visual characteristics described in the mask.

Figure 33:
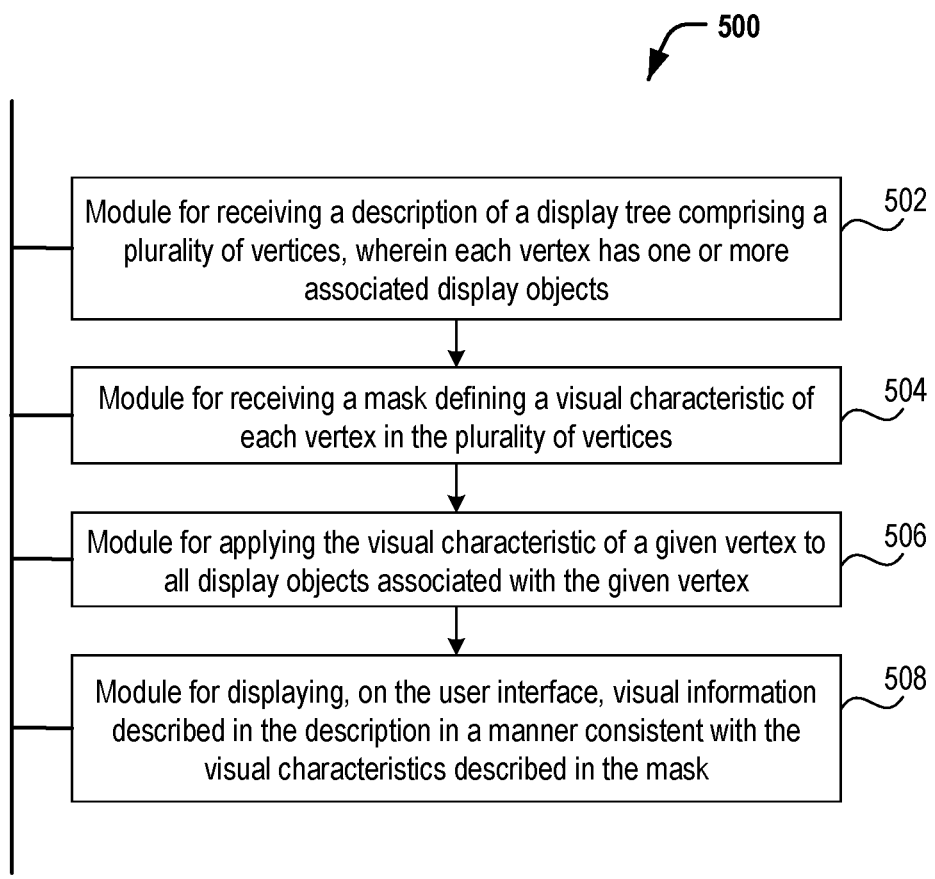
FIG. 33 is a block diagram representation of an apparatus for displaying data on a user interface.

FIG. 33 is a block diagram representation of an apparatus 500 for displaying data on a user interface. The module 502 is for receiving a description of a display tree comprising a plurality of vertices, wherein each vertex has one or more associated display objects. The module 504 is for receiving a mask defining a visual characteristic of each vertex in the plurality of vertices. The module 506 is for applying the visual characteristic of a given vertex to all display objects associated with the given vertex. The module 508 is for displaying, on the user interface, visual information described in the description in a manner consistent with the visual characteristics described in the mask.

The above-described use of the display tree structure and the ROST format may advantageously be used in situations where multiple users share or view the same data from a server. One example scenario is when user A in San Diego may want a user B in Phoenix to be able to jointly browse through a web site that sells toys so that user A can choose a toy as a gift to user B's daughter. Another example scenario may be when a stockbroker may want a client to be able to view data and graphs as the stock broker walks through the client's portfolio and provides explanation or choices for making trades. Yet another example scenario may include a joint collaborative research effort between two researchers that are geographically separated and looking at or charting certain data in a database, while a third researcher, in an unrelated activity, may be either modifying the data or copying the data for a research paper he is editing.

In some implementations, the above-described display tree and ROST formats may be useful in providing a shared view to data to multiple users. For example, in some implementations, each display tree, at its root (e.g., the starting point), may be identified by a unique id. This id may be sent by the server to the first user when the first user initiates a viewing session. The first user may then be able to communicate the unique id to the second user. The second user can then point his viewing application (e.g., web browser) to the server using the unique id. At this time, the server may become aware that two users are now sharing view of the same data (e.g., session) and may therefore provide views and view refreshes to the two users in a contemporaneous manner. The previously discussed display masks and vertexes can be advantageously used to reduce the amount of refresh data to be sent to each viewer and also provide a way in which views to multiple users are synchronously managed (i.e., the state of a vertex—e.g., a one byte information—may provide viewing status for hundreds of data items in a compact and consistent manner to all users).

Figure 34:
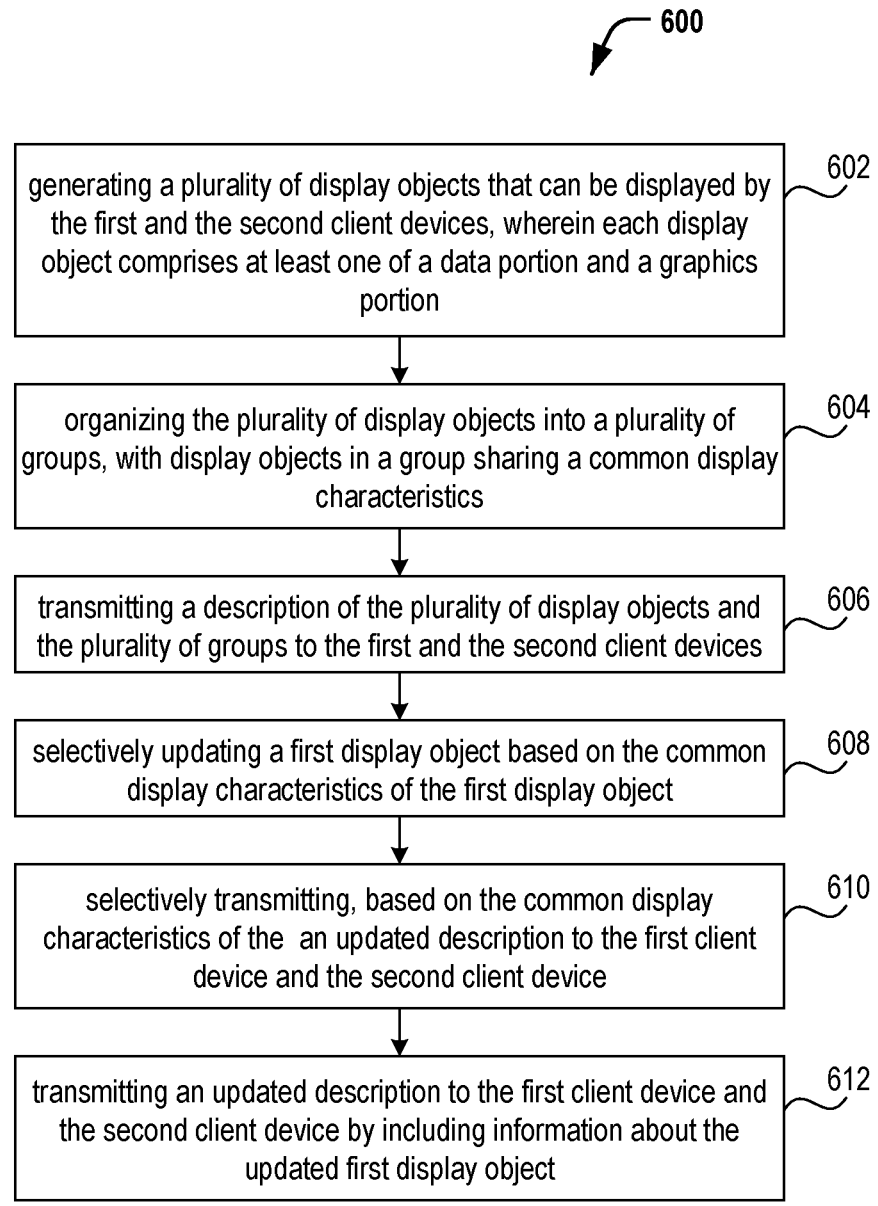
FIG. 34 is a flow chart representation of a method of providing visualization data to a first client device and a second client device.

FIG. 34 is a flowchart representation of a process 600 of providing visualization data to a first client device and a second client device.

At 602, a server is controlled to generate a plurality of display objects that can be displayed by the first and the second client devices, wherein each display object comprises at least one of a data portion and a graphics portion.

At 604, the server is controlled to organize the plurality of display objects into a plurality of groups, with display objects in a group sharing a common display characteristics. For example, one display characteristic may include whether or not the group is in active view of a user. Another display characteristic may include whether or not a third user is able to edit or view the data. Yet another display characteristic may include display aspects such as display pixel dimensions, color, etc.

At 606, the server is controlled to transmit a description of the plurality of display objects and the plurality of groups to the first and the second client devices. In some implementations the server is controlled to provide autonomous periodic refreshes. For example, a one second to 5 second periodic refresh rate may be satisfactory for some applications. In some implementations, the server may refresh based on a user activity (e.g., increase refresh rate when a user is actively interacting with the data).

At 608, the server is controlled to selectively update a first display object based on the common display characteristics of the first display object. For example, the update may include providing new or changed values of the display object (e.g., in the above-described airlines reservation scenario, when a seat is purchased by someone else).

At 610, the server is controlled to selectively transmit, based on the common display characteristics of the an updated description to the first client device and the second client device. In some implementations, each of the multiple users sharing the same data view may receive the updated description based on the display size of their devices. For example, a user on a large screen device may receive data updates more frequently (because there is a greater amount of data visible on her screen) than another user sharing the same view using a smaller screen sized device.

At 612, the server is controlled to transmit an updated description to the first client device and the second client device by including information about the updated first display object. The server thus may provide synchronized viewing updates to the multiple client devices.

Figure 35:
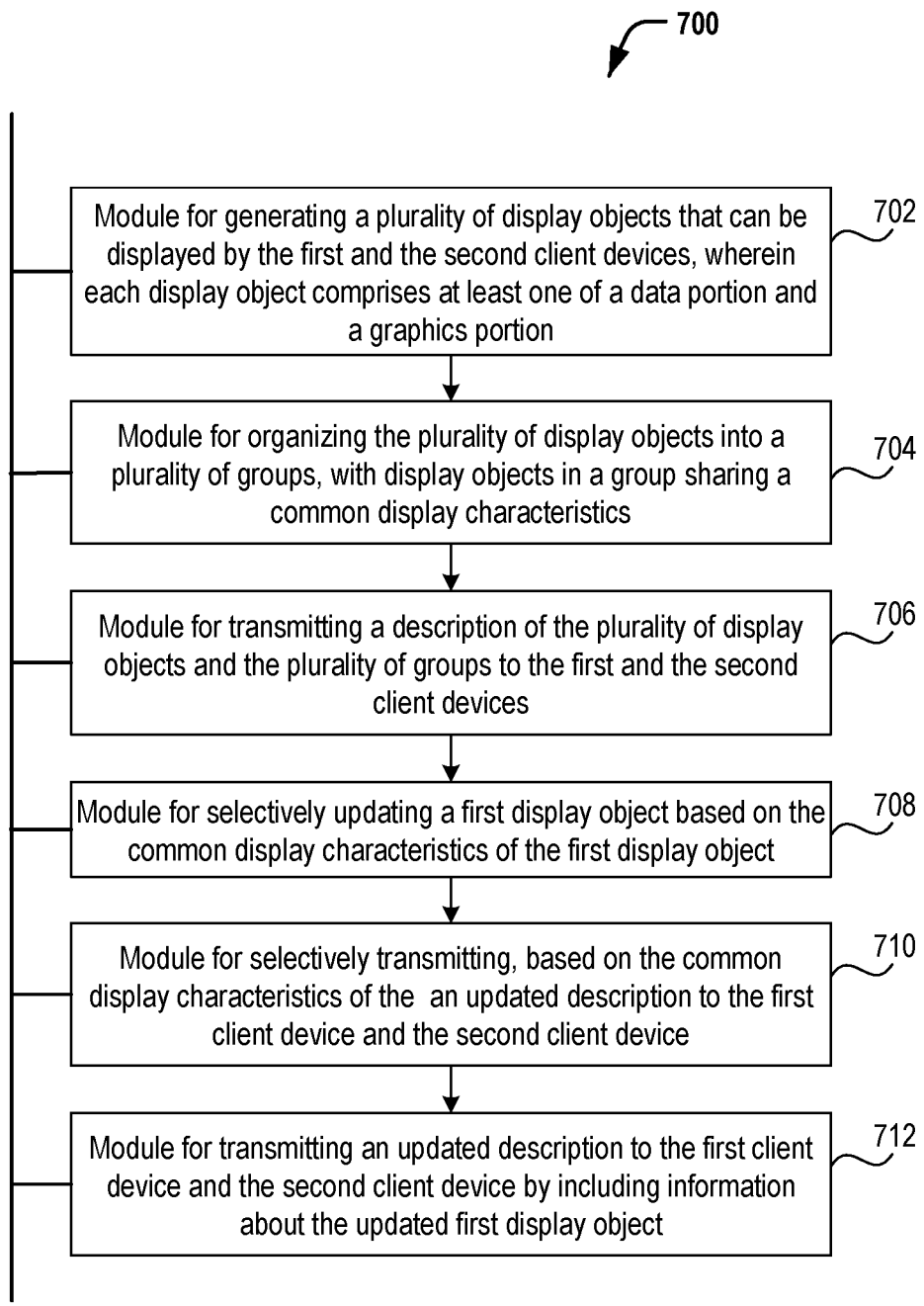
FIG. 35 is a block diagram of an apparatus for providing visualization data to a first client device and a second client device.

FIG. 35 is a block diagram representation of an apparatus for providing visualization data to a first client device and a second client device. The module 702 is for generating a plurality of display objects that can be displayed by the first and the second client devices, wherein each display object comprises at least one of a data portion and a graphics portion. The module 704 is for organizing the plurality of display objects into a plurality of groups, with display objects in a group sharing a common display characteristics. The module 706 is for transmitting a description of the plurality of display objects and the plurality of groups to the first and the second client devices. The module 708 is for selectively updating a first display object based on the common display characteristics of the first display object. The module 710 is for selectively transmitting, based on the common display characteristics of the an updated description to the first client device and the second client device. The module 712 is for transmitting an updated description to the first client device and the second client device by including information about the updated first display object.

In some embodiments, a technique for facilitating viewing of data by a user operating a client device includes, opening a viewing session with the client device, wherein the viewing session is identified with a unique identification. The technique further includes transmitting an initial description of data for viewing at the client device, wherein the initial description comprises data organized as an information tree having a plurality of vertices, with each vertex comprising corresponding visual data that whose visual characteristics are simultaneously manipulatable by a single user action (e.g., simultaneously expand or collapse all objects from the view using GUI control widget). The technique further includes monitoring a visual state of the viewing session, the visual state indicating which vertices of the information tree are in active view and which vertices are not in active view at the client device. The technique further includes selectively updating a given visual data only when visual state indicates that the given visual data is in active view. The technique further includes communicating the updated given visual data to the client device as a difference from a previously sent description of data, wherein visual data includes at least one of an alphanumeric character, a graphical object or a graphical instruction.

In the above-discussed scenarios when a user is viewing and possibly modifying data from a database at a server, other users may also be simultaneously changing value of certain data. One example is a scenario such as GoogleDocs where multiple users can edit the same document. However, unlike GoogleDocs, the document or data may be being edited simultaneously. In these situations, several actions may be happening to a data field at the same time. For example, the server may have one value for a given data field. A first user may be in the process of editing the data field by editing a second value and may therefore be viewing the data field as it is being edited by the first user. Similarly, a second user may be in the process of editing the same data field with a completely different third value and may be seeing an entirely different data field during his editing process. Without rules to streamline this process, a race condition may arise in which both users or one of the users may either overwrite each other or lose their edits without becoming aware of the failure.

To overcome such situations, and other problems, the present provides for techniques in which a behavior is defined for local caches of a user's edits to shared data. In some implementations, the local memory includes a record for all edits attempted by the user and the status of whether these edits were successfully accepted by the server or not. In some implementations, visual cues such as green/red colors may be used to indicate to the user whether his edits were successful or not. In some implementations, the user can access the locally stored editing history stack to check whether or not his edits were successful and, if not, why they were not successful. For unsuccessful edits (e.g., when another user beats the user to changing that data field), the user may be able to recall his edit and attempt to re-edit the field that has now been changed by another user.

In some embodiments, a method implemented at a client computer for visual editing of a data item stored on a server includes receiving a first value of the data item from the server (e.g., a value of the data item that is stored in the server's record), displaying a second value of the data item on a display (e.g., the value that is being edited by the user—e.g., this value may have started as the first value but the user may be mid-edit), receiving a third value input for the data item from a user (i.e., when the user has finished editing the value and indicates that he wishes to commit the change), checking with the server whether or not the server can commit to replacing the first value at the server with the third value, receiving a response from the server indicating success/failure in replacing the first value with the third value, and updating a local memory stack based on the response received from the server.

The local memory stack may be updated with an error message, e.g., when the response indicates that the replacing was unsuccessful. In some cases, while the user is editing the field (i.e., while the second value is displayed in the field), the user may receive a view refresh from the server and a third value may overwrite the user's mid-edit value. In some implementations, the user device may, upon this overwriting, provide a visual alert (e.g., flash the screen or flash red color in the data field) to the user indicating that the user's edit was lost (i.e., the user was not able to successfully replace the first value with his edited second value).

Many real life examples of data sharing include multiple users, having a mixed level of read/write authorization to a database, sharing the same database. Some example applications include traders sharing the same stock or money data, users in a business organization sharing the same files, data (e.g., payroll), medical practitioners sharing patient data, e-commerce sellers and buyers using the same inventory database, and so on. The client device 2904 used by each user may have different display capabilities (e.g., screen size, graphics capabilities, etc.). It may be desirable to provide a visual access to the shared data using techniques that allow adaptation of database access based on client device capabilities. For example, in some cases, new windows or data viewing panes may be opened when a user desires to zoom in or zoom out on data, or manipulate data to draw graphs etc. This processed data, called detachment data, could be displayed to the user on a full screen window, or in a second window (e.g., a pop-up window) and so on. No techniques presently provide for a streamlined control of shared view to the same data by multiple users operating client devices with different capabilities.

In some embodiments, a technique for providing access to a database includes receiving a display profile from a client device, receiving a data view request from a user of the client device, starting a data viewing session based on the received data view request, associating the data viewing session with the user, specifying to the client device a first display property of data being viewed based on the display profile of the client device, receiving another data view request for the same session from the user using another client device, and specifying to the another client device a second display property of data being viewed based on a second display profile of the another client device.

One of skill in the art will also appreciate that several techniques for viewing of data are provided. In some examples, a user using a client device receives views of a database from a server in a compact format organized as a display tree comprising vertices. At least some visual characteristics of all data belonging to a given vertex are controlled by simply specifying the visual characteristic at the vertex level. In one advantageous aspect, the vertex level specification is compact, because it makes it un-necessary to individually list visual characteristics for possibly hundreds of data objects under the vertex.

One of skill in the art will further appreciate that techniques are provided for multiple users to share views of the same data. A server provides synchronous updates to the data to all the users sharing a same session, e.g., the same id of a display tree.

It will further be appreciated that techniques are provided for local storing of a user's data edits so that no data is lost when a user is unsuccessful to edit a shared data field on the server.

It will further be appreciated that techniques are disclosed for a server to provide data views to client devices having different hardware/software capabilities.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method of providing visualization data to a client device, comprising:
    receiving, by a client application on the client device, a user input to change a visual characteristic of a display object tree;
    transmitting, to a server comprising a server cache and in response to the user input, an event message comprising an indication of the user input;
    updating, using a client cache and based on the user input, the display object tree on the client device;
    receiving, from the server, a description of a difference tree, wherein the server is configured to generate the difference tree based on the user input and a display tree stored in the server cache;
    patching, based on the description of the difference tree, a display tree in the client cache; and
    selectively updating, subsequent to the patching and based on the display tree in the client cache, the display object tree on the client device,
    wherein a plurality of display objects is assigned to each of a plurality of vertices of the display object tree on the client device, wherein the user input comprises a mask, wherein the mask specifies visual characteristics of the plurality of vertices, and wherein the visual characteristics of a given vertex simultaneously controls display attributes of all display objects assigned to the given vertex, and
    wherein the mask comprises (i) a screen mask corresponding to the visual characteristics of the display object tree on the client device, and (ii) a reference mask corresponding to the visual characteristics of the display tree stored in the server cache.

2. The method of claim 1, wherein updating the display object tree on the client device using the client cache incurs no server delay.

3. The method of claim 1, wherein selectively updating the display object tree on the client device comprises refraining from updating the display object tree on the client device upon a determination that the user input is a valid user input.

4. The method of claim 1, further comprising:
    updating, based on the user input, the screen mask; and
    refraining, prior to receiving the description of the difference tree, from updating the reference mask.

5. The method of claim 1, further comprising:
    updating, based on the user input prior to receiving the description of the difference tree, the screen mask; and
    updating, based on the description of the difference tree, the reference mask.

6. The method of claim 1, wherein the screen mask and the reference mask are Boolean functions.

7. The method of claim 1, wherein the visual characteristics include information about whether or not each of the plurality of vertices are visually occluded.

8. The method of claim 1, wherein the description of the difference tree is transmitted using a reference/optimistic/screen/typed value (ROST) data transfer format.

9. An apparatus for providing visualization data to a client device, comprising:
    a client application; and
    a client cache coupled to the client application,
    wherein the client application is configured to:
        receive a user input to change a visual characteristic of a display object tree,
        transmit, to a server comprising a server cache and in response to the user input, an event message comprising an indication of the user input,
        update, using the client cache and based on the user input, the display object tree on the client device,
        receive, from the server, a description of a difference tree, wherein the server is configured to generate the difference tree based on the user input and a display tree stored in the server cache,
        patch, based on the description of the difference tree, a display tree in the client cache, and
        selectively update, subsequent to the patching and based on the display tree in the client cache, the display object tree on the client device,
    wherein a plurality of display objects is assigned to each of a plurality of vertices of the display object tree on the client device, wherein the user input comprises a mask, wherein the mask specifies visual characteristics of the plurality of vertices, and wherein the visual characteristics of a given vertex simultaneously controls display attributes of all display objects assigned to the given vertex, and
    wherein the mask comprises (i) a screen mask corresponding to the visual characteristics of the display object tree on the client device, and (ii) a reference mask corresponding to the visual characteristics of the display tree stored in the server cache.

10. The apparatus of claim 9, wherein updating the display object tree on the client device using the client cache incurs no server delay.

11. The apparatus of claim 9, wherein selectively updating the display object tree on the client device comprises refraining from updating the display object tree on the client device upon a determination that the user input is a valid user input.

12. The apparatus of claim 11, wherein the screen mask and the reference mask are Boolean functions.

13. A non-transitory computer readable storage medium having code stored thereon, the code, when executed by a processor, causing the processor to implement a method of displaying data on a client device, to a user, the data comprising a plurality of data items, the method comprising:
    receiving, by a client application, a user input to change a visual characteristic of a display object tree;

transmitting, to a server comprising a server cache and in response to the user input, an event message comprising an indication of the user input;

updating, using a client cache and based on the user input, the display object tree on the client device;

receiving, from the server, a description of a difference tree, wherein the server is configured to generate the difference tree based on the user input and a display tree stored in the server cache;

patching, based on the description of the difference tree, a display tree in the client cache; and selectively updating, subsequent to the patching and based on the display tree in the client cache, the display object tree on the client device, wherein a plurality of display objects is assigned to each of a plurality of vertices of the display object tree on the client device, wherein the user input comprises a mask, wherein the mask specifies visual characteristics of the plurality of vertices, and wherein the visual characteristics of a given vertex simultaneously controls display attributes of all display objects assigned to the given vertex, and wherein the mask comprises (i) a screen mask corresponding to the visual characteristics of the display object tree on the client device, and (ii) a reference mask corresponding to the visual characteristics of the display tree stored in the server cache.

14. The non-transitory computer readable storage medium of claim 13, wherein updating the display object tree on the client device using the client cache incurs no server delay.

15. The non-transitory computer readable storage medium of claim 13, wherein selectively updating the display object tree on the client device comprises refraining from updating the display object tree on the client device upon a determination that the user input is a valid user input.

16. The non-transitory computer readable storage medium of claim 13, wherein the screen mask and the reference mask are Boolean functions.

17. The non-transitory computer readable storage medium of claim 13, wherein the method further comprises:
updating, based on the user input, the screen mask; and
refraining, prior to receiving the description of the difference tree, from updating the reference mask.

18. The non-transitory computer readable storage medium of claim 13, wherein the method further comprises:
updating, based on the user input prior to receiving the description of the difference tree, the screen mask; and
updating, based on the description of the difference tree, the reference mask.

\* \* \* \* \*